(12) United States Patent
Hasegawa

(10) Patent No.: US 8,942,325 B2
(45) Date of Patent: Jan. 27, 2015

(54) WIRELESS COMMUNICATION APPARATUS AND COMMUNICATION METHOD

(71) Applicant: Fujitsu Limited, Kawasaki-shi, Kanagawa (JP)

(72) Inventor: Tsuyoshi Hasegawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 14/262,907

(22) Filed: Apr. 28, 2014

(65) Prior Publication Data

US 2014/0233682 A1    Aug. 21, 2014

Related U.S. Application Data

(63) Continuation of application No. PCT/JP2011/075335, filed on Nov. 2, 2011.

(51) Int. Cl.
| | | |
|---|---|---|
| H04L 27/06 | (2006.01) | |
| H04L 25/02 | (2006.01) | |
| H04B 7/04 | (2006.01) | |
| H04L 27/26 | (2006.01) | |
| H04B 7/08 | (2006.01) | |

(52) U.S. Cl.
CPC .............. *H04L 25/0242* (2013.01); *H04B 7/04* (2013.01); *H04L 27/2647* (2013.01); *H04B 7/08* (2013.01)
USPC .......................................................... 375/340

(58) Field of Classification Search
USPC .......... 375/267, 316, 340, 346–350; 370/210; 455/133, 136
See application file for complete search history.

(56) References Cited

U.S. PATENT DOCUMENTS

| | | | | |
|---|---|---|---|---|
| 6,449,303 | B2* | 9/2002 | Hunton | 375/130 |
| 7,194,039 | B2* | 3/2007 | Hunton | 375/260 |
| 7,239,675 | B2* | 7/2007 | Zehavi et al. | 375/334 |

FOREIGN PATENT DOCUMENTS

| | | |
|---|---|---|
| JP | 2006-005791 | 1/2006 |
| JP | 2009-253980 | 10/2009 |

(Continued)

OTHER PUBLICATIONS

Kenichi Higuchi et al., "Adaptive Selection of Surviving Symbol Replica Candidates Based on Maximum Reliability in QRM-MLD for OFCDM MIMO Multiplexing", IEEE Communications Society Globecom 2004, pp. 2480-2486.

(Continued)

*Primary Examiner* — Khanh C Tran
(74) *Attorney, Agent, or Firm* — Fujitsu Patent Center

(57) ABSTRACT

A wireless communication apparatus receiving a signal transmitted from multiple transmission antennas by multiple reception antennas, includes a rotational component removal unit to remove rotational components from a channel matrix representing a characteristic of a transmission path between the multiple transmission antennas and reception antennas, the channel matrix being generated based on the reception signal; multiple signal separation units including at least a signal separation unit to use a first signal separation algorithm for a demodulation process of the reception signal, and a signal separation unit to use a second signal separation algorithm for the demodulation process of the reception signal; and a control unit to execute control for determining one of the multiple signal separation units to be used for the demodulation process of the reception signal, based on a predetermined component of the channel matrix having the rotational components removed.

15 Claims, 16 Drawing Sheets

(56) References Cited

FOREIGN PATENT DOCUMENTS

| | | |
|---|---|---|
| JP | 2011-166293 | 8/2011 |
| WO | 2007069153 | 6/2007 |

OTHER PUBLICATIONS

International Search Report, mailed in connection with PCT/JP2011/075335 and mailed Nov. 29, 2011.

* cited by examiner

■ OFDM SYMBOL USED FOR SWITCHING DETERMINATION

▦ OFDM SYMBOL THAT USES SWITCHING DETERMINATION RESULT OF THE OTHER OFDM SYMBOL

WIRELESS COMMUNICATION APPARATUS AND COMMUNICATION METHOD

CROSS-REFERENCE TO RELATED APPLICATIONS

This application is a continuation application of International Application PCT/JP2011/075335 filed on Nov. 2, 2011 and designated the U.S., the entire contents of which are incorporated herein by reference.

FIELD

The disclosures herein generally relate to a wireless communication system.

BACKGROUND

In recent years, as a method of mobile wireless communication, the MIMO (Multiple-Input Multiple-Output) method, which uses multiple antennas, has begun to be used for transmission and reception of a wireless signal. Especially, if using MIMO-multiplexed transmission for orthogonal frequency division multiplexing (OFDM) access, MIMO demodulation becomes easier. This is because a signal separation process can be implemented with high accuracy without being influenced by multipath interference.

Concrete wireless communication methods that use MIMO-multiplexed transmission for OFDM access include the LTE (Long Term Evolution).

Various methods have been proposed for signal separation technologies in the MIMO technology.

Among the signal separation technologies in the MIMO technology, it is considered practical to adopt an MLD (Maximum Likelihood Detection) method. This is because a better characteristic is obtained by executing a demodulation process using an MLD method than by executing the demodulation process using other signal separation technologies. However, there is a problem that the amount of calculation is considerable.

As one of the signal separation technologies, another MLD method is known that reduces the amount of calculation while avoiding degradation of the characteristic (see, for example, Non-Patent Document 1). Therefore, it is considered that implementation of the signal separation technology using the MLD method may become popular in user terminals.

Also, as a signal separation technology in the MIMO technology, an MMSE (Minimum Mean Square Error) method is proposed to be used for the demodulation process. This is because the amount of calculation is less when executing the demodulation process using an MMSE method than when executing the demodulation process using an MLD method. However, the characteristic is inferior to those obtained by the demodulation process using an MLD method.

Therefore, it is preferable to adopt an MLD method if the characteristic is prioritized over the amount of calculation.

RELATED-ART DOCUMENTS

Non-Patent Document

[Non-Patent Document 1] Kenichi Higuchi, Hiroyuki Kawai, Noriyuki Maeda, and Mamoru Sawahashi, "Adaptive Selection of Surviving Symbol Replica Candidates Based on Maximum Reliability in QRM-MLD for OFCDM MIMO Multiplexing", IEEE Communications Society Globecom 2004.

At 3GPP (3rd Generation Partnership Project), the LTE-Advanced has been investigated to realize further high-speed, large-capacity communication beyond the LTE (Long Term Evolution).

One of the objects of the LTE-Advanced is high-speed, large-capacity communication. For realizing high-speed, large-capacity communication, the investigation has been oriented towards a greater transmission bandwidth. For example, if executing the demodulation process using a signal separation method that requires a considerable amount of calculation such as an MLD method, the amount of calculation further increases along with a greater transmission bandwidth, which may increase power consumption of a receiver such as a cellular phone terminal. Also, such a greater transmission bandwidth makes the size of a circuit greater for executing signal separation by an MLD method.

On the other hand, if adopting a signal separation method having a smaller amount of calculation such as an MMSE method, power consumption and the size of a circuit are smaller, although a sufficient characteristic may not be obtained.

SUMMARY

According to at least an embodiment of the present invention, a wireless communication apparatus receiving a signal transmitted from a plurality of transmission antennas by a plurality of reception antennas, includes a rotational component removal unit configured to remove rotational components from a channel matrix representing a characteristic of a transmission path between the plurality of transmission antennas and the plurality of reception antennas, the channel matrix being generated based on the reception signal; a plurality of signal separation units including at least a signal separation unit configured to use a first signal separation algorithm for a demodulation process of the reception signal, and a signal separation unit configured to use a second signal separation algorithm for the demodulation process of the reception signal; and a control unit configured to execute control for determining one of the plurality of signal separation units to be used for the demodulation process of the reception signal, based on a predetermined component of the channel matrix having the rotational components removed.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

DESCRIPTION OF EMBODIMENTS

In the following, embodiments of the present invention will be described with reference to the drawings. Note that the same functions across the drawings are assigned the same numerical codes, and their description may not be repeated.

First Embodiment

Wireless Communication Apparatus

Figure 1:
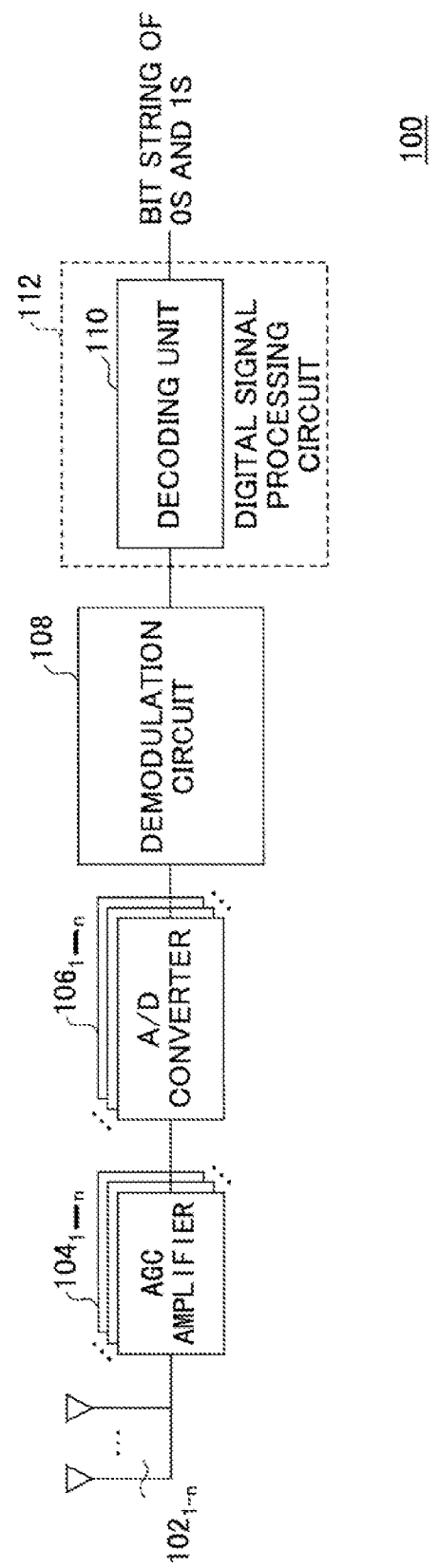
FIG. 1 is a schematic view illustrating an example of a wireless communication apparatus according to an embodiment.

FIG. 1 illustrates a wireless communication apparatus 100 according to the present embodiment. The wireless communication apparatus 100 may be used for a user terminal or a base station. A hardware configuration is mainly illustrated in FIG. 1. Analog elements are omitted in FIG. 1. Specifically, duplexers, filters, downconverters, low-noise amplifiers, and the like are omitted. As shown in FIG. 1, a MIMO-multiplexed wireless signal can be received by providing multiple antennas $102_{1-n}$, AGCs $104_{1-n}$, and A/D converters $106_{1-n}$ so that the signal can be input into a demodulation circuit 108. In the following paragraphs, the multiple antennas $102_{1-n}$, AGCs $104_{1-n}$ and A/D converters $106_{1-n}$ are sometimes referred to as antenna 102, AGC 104, and A/D converter 106.

The wireless communication apparatus 100 includes an antenna 102, an AGC (Automatic Gain Control) amplifier 104, an A/D converter 106, the demodulation circuit 108, and a digital signal processing circuit 112.

The antenna 102 receives a signal that has been multiplexed and transmitted from another wireless communication apparatus having multiple antennas.

The AGC amplifier 104 is connected with the antenna 102. The AGC amplifier 104 automatically adjusts gain of a built-in amplification circuit when the amplitude of a reception signal fluctuates that is received by the antenna 102 and further downconverted to an IF band. The AGC amplifier 104 outputs a stable signal to the A/D converter 106 that is linearly amplified by automatically adjusting the gain of the built-in amplification circuit.

The A/D converter 106 is connected with the AGC amplifier 104. The A/D converter 106 converts an analog signal from the AGC amplifier 104 into a digital signal. The A/D converter 106 inputs the digital signal into the demodulation circuit 108.

The demodulation circuit 108 is connected with the A/D converter 106. Based on the digital signal from the A/D converter 106, the demodulation circuit 108 executes processes such as synchronized detection, separation of a MIMO-multiplexed signal, and the like. A log likelihood ratio (LLR) is calculated for each bit of the MIMO-multiplexed signal having the signal separation applied by the demodulation circuit 108, and the LLR is input into the digital signal processing circuit 112.

The digital signal processing circuit 112 is connected with the demodulation circuit 108. The digital signal processing circuit 112 includes a decoding unit 110. The decoding unit 110 executes error correction based on the output signal from the demodulation circuit 108. The decoding unit 110 outputs a bit string of 0s and 1s that has the error correction applied.

<Demodulation Process>

Figure 2:
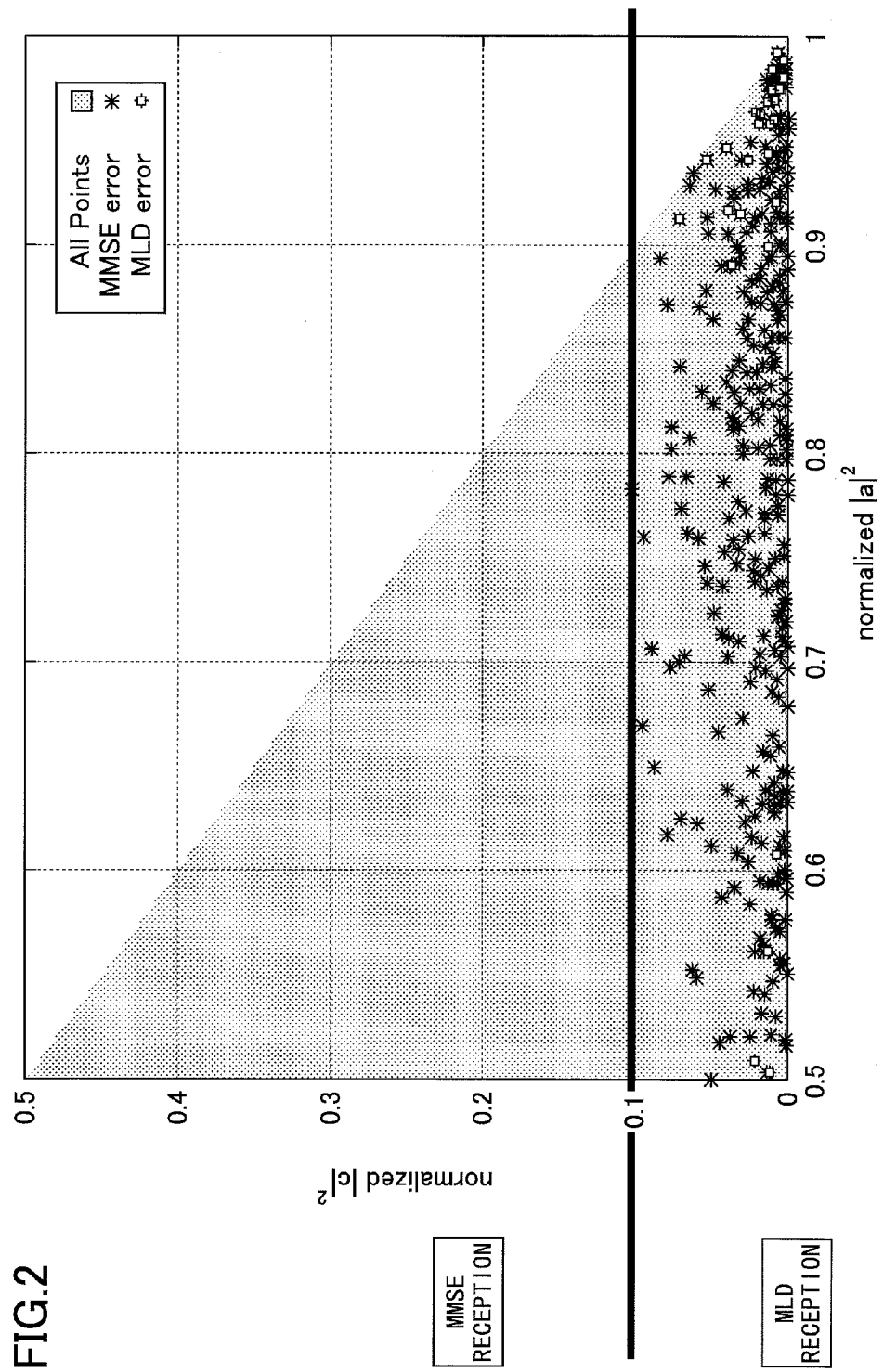
FIG. 2 is a schematic view illustrating an example of a relationship between a propagation environment and reception errors.

FIG. 2 illustrates a relationship between a propagation environment and reception errors. Distribution of reception errors is illustrated in FIG. 2 that is obtained by changing a transmission path. Specifically, a channel matrix H, which has a Rayleigh distribution in MIMO-multiplexed transmission using two reception/transmission antenna branches, is applied with QR decomposition.

This will be concretely described below.

Consider a case where a signal transmitted from two transmission antennas is received by two reception antennas. Denoting a two-dimensional transmission vector by x, a two-dimensional reception vector by y, a two-dimensional noise vector by n, and a 2×2 channel matrix by H, then, the reception vector y is represented by the following formula (1).

$$y = Hx + n \qquad (1)$$

Also, the channel matrix includes components that represent channel response values between reception/transmission antennas. Components may be called elements. The formula (1) can be represented by the following formula (2).

$$\begin{pmatrix} y_0 \\ y_1 \end{pmatrix} = \begin{pmatrix} h_{11} & h_{12} \\ h_{21} & h_{22} \end{pmatrix} \begin{pmatrix} x_0 \\ x_1 \end{pmatrix} + \begin{pmatrix} n_0 \\ n_1 \end{pmatrix} \qquad (2)$$

In the formula (2), $y_0$ and $y_1$ denote reception signal points, $x_0$ and $x_1$ denote transmission signal points (or transmission signal candidate points), $h_{11}$, $h_{12}$, $h_{21}$, and $h_{22}$ denote components of the channel matrix H, and $n_0$ and $n_1$ denote noise components.

Note that the channel matrix H can be decomposed into a unitary matrix Q (a matrix defined as $QQ^* = Q^*Q = I$ where $Q^*$ is the complex conjugate transpose matrix of Q and I is an identity matrix) and an upper triangular matrix R (QR decomposition) as represented in the following formula (3).

$$H = QR \qquad (3)$$

where R is represented by the following formula (4).

$$R = \begin{pmatrix} a & b \\ 0 & c \end{pmatrix} \quad (4)$$

Among the orthogonal matrix (unitary matrix) Q and the upper triangular matrix R that are obtained by QR decomposition of the channel matrix H, the upper triangular matrix R is normalized. Among diagonal components of the normalized upper triangular matrix R, the upper left component (referred to as "a" below) is squared to be taken as a value on the X-axis, the lower right component (referred to as "c" below) is squared to be taken as a value on the Y-axis, and a propagation environment represented by $a^2$ and $c^2$ is plotted on the X-Y plane to see whether a reception error occurs. Note that the absolute value of the component "a" may be taken as a value on the X-axis, and the absolute value of the component "c" may be taken as a value on the Y-axis for the same process. By exchanging columns of H so that columns having greater power come to the left, then executing QR decomposition and normalization of the upper triangular matrix R, all transmission paths can be contained within a triangular-shaped distribution in FIG. 2.

The distribution in FIG. 2 includes transmission paths without errors (All Points) as results of demodulation processes using an MLD method and an MMSE method, transmission paths with errors (MMSE error) as results of demodulation processes using the MMSE method, and transmission paths with errors (MLD error) as results of demodulation processes using the MLD method. The transmission paths with errors as results of demodulation processes using the MMSE method are distributed about the bottom line of the distribution.

Specifically, most of the MMSE errors occur for the transmission paths that have $c^2$ less than 0.1. The transmission paths with errors as results of demodulation processes using the MLD method are also distributed about the bottom line of the distribution. Specifically, the MLD errors occur for the transmission paths that have $c^2$ less than 0.1, and $a^2$ greater than or equal to 0.5 and less than 0.65, or $a^2$ greater than or equal to 0.85 and less than 1.

Here, a conventional MMSE method and a MLD method will be briefly described.

<MMSE Method>

A reception vector Y of a reception signal $y_q$ at a reception antenna q is represented by the following formula (5). As an example, a case is illustrated where the number of transmission antennas is four (p=4) and the number of reception antennas is four (q=4).

$$Y = \begin{bmatrix} y_1 \\ y_2 \\ y_3 \\ y_4 \end{bmatrix} = HX + N = \begin{bmatrix} \xi_{1,1} & \xi_{2,1} & \xi_{3,1} & \xi_{4,1} \\ \xi_{1,2} & \xi_{2,2} & \xi_{3,2} & \xi_{4,2} \\ \xi_{1,3} & \xi_{2,3} & \xi_{3,3} & \xi_{4,3} \\ \xi_{1,4} & \xi_{2,4} & \xi_{3,4} & \xi_{4,4} \end{bmatrix} \begin{bmatrix} d_1 \\ d_2 \\ d_3 \\ d_4 \end{bmatrix} + \begin{bmatrix} n_1 \\ n_2 \\ n_3 \\ n_4 \end{bmatrix} \quad (5)$$

where H is a channel matrix that represents fading fluctuation $\xi_{p,q}$ between the transmission antennas p and reception antennas q; X is a transmission vector that represents transmission signals $d_p$ of the transmission antennas p; and N is noise vector that represents Gaussian noise $n_q$ generated with the reception antennas q. In case of OFDMA, the formula (5) corresponds to reception symbols of subcarriers.

The wireless communication apparatus 100 calculates an estimated channel matrix ^H using a received pilot symbol, and generates a weight matrix represented by the following formula (6) from the ^H.

$$W = \hat{H}^H \{\hat{H}\hat{H}^H + NI\}^{-1} \quad (6)$$

where I represents an identity matrix and $A^H$ represents Hermitian transpose of a matrix A. The wireless communication apparatus 100 multiplies the reception signal vector by the above weight W. In this way, an equalization process is executed for a transmission signal from one of the transmission antennas so that interference with transmission signals from the other transmission antennas is suppressed.

<MLD Method>

An MLD method is a signal separation method based on maximum likelihood estimation. A reception signal replica is generated using a channel matrix estimated for every combination of transmission signal point candidates $c_p$ in digital modulation with all transmission antennas p. A metrics e is calculated as represented by the following formula (7) based on the square of a Euclidean distance between a reception signal and a reception signal replica for every one of the candidates. As an example, a case is illustrated where the number of transmission antennas is four (p=4).

$$e = \left\| Y - \hat{H} \begin{bmatrix} c_1 \\ c_2 \\ c_3 \\ c_4 \end{bmatrix} \right\|^2 \quad (7)$$

Signal separation is executed by selecting a combination of transmitting symbol candidates $c_p$ (p=1 . . . 4) that has a minimum metric e of the formula (7).

It can be seen in FIG. 2 that virtually no errors occur in demodulation processes using the MMSE method as long as $c^2$ is greater than a certain value even for the same S/N. Therefore, for transmission paths having $c^2$ greater than the certain value, it is assumed that a characteristic may not be considerably influenced even if the demodulation process is executed using the MMSE method. Specifically, in a propagation environment where $c^2$ is greater than or equal to 0.1, if executing the demodulation process using the MMSE method, a characteristic is obtained that is substantially the same as using the MLD method.

The demodulation circuit in the present embodiment executes a demodulation process using the MMSE method if it can be assumed that no problems occur when executing the demodulation process using the MMSE method. Specifically, the demodulation process using the MMSE method is executed if a relationship between the propagation environment and reception errors is obtained as illustrated in FIG. 2, namely if $c^2$ is greater than or equal to 0.1.

If the transmission bandwidth is greater, it is assumed various propagation channels are distributed over subcarriers as a whole. By executing the demodulation process using the MMSE method depending on propagation channels, the amount of calculation can be reduced for demodulation compared to a case where the demodulation process using the MLD method is executed for all subcarriers.

Figure 3:
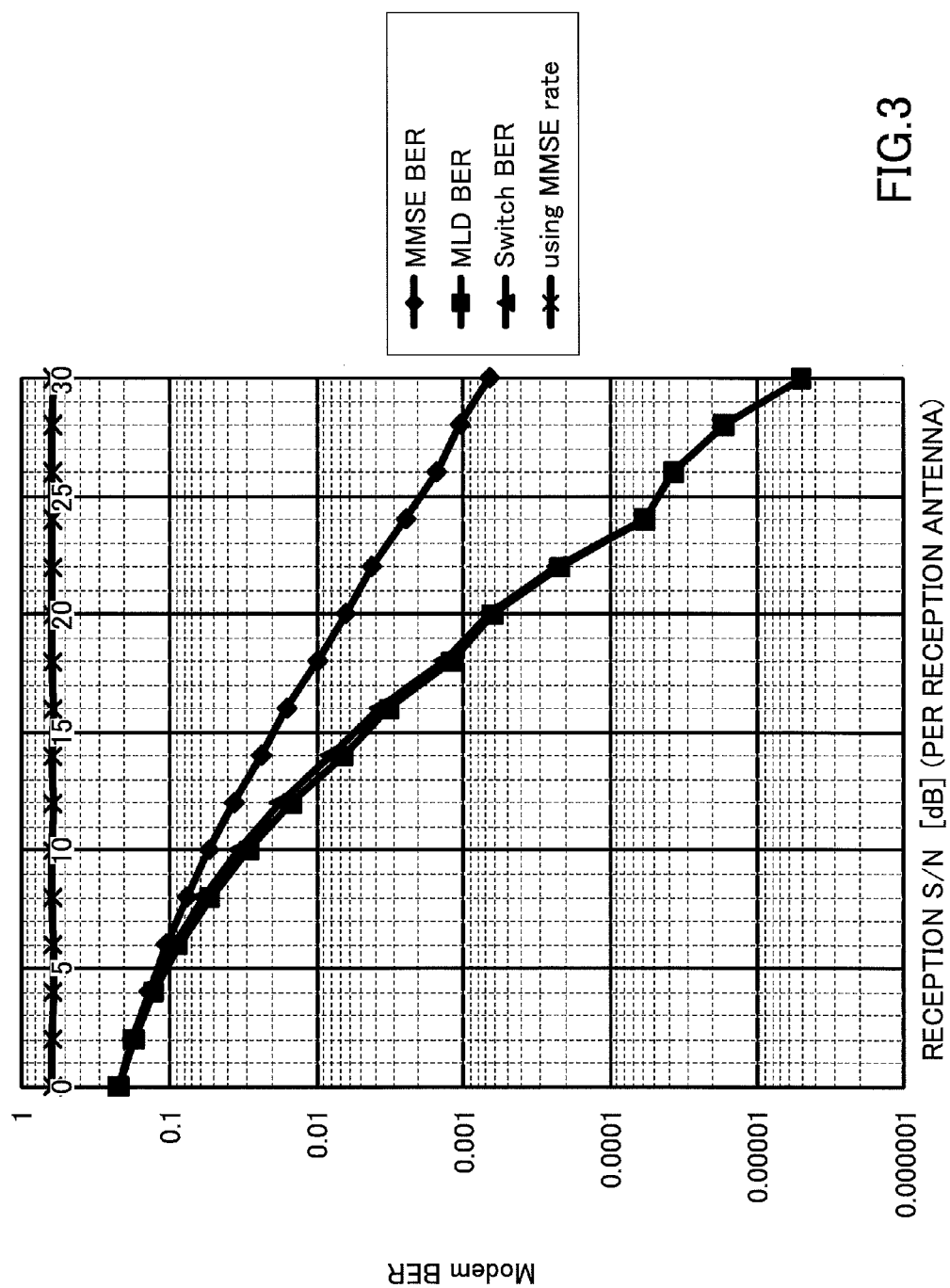
FIG. 3 is a schematic view illustrating an example of a relationship between reception S/N and reception errors when a demodulation process is switched between an MMSE method and a MLD method.

FIG. 3 illustrates a BER characteristic comparison that compares demodulation processes by using the MMSE method only, by using the MLD method only, and by switching the MMSE method and the MLD method based on $c^2$. It is illustrated for a case where a signal is transmitted from two transmission antennas, which is then received by two reception antennas. FIG. 3 also illustrates a rate of using the MMSE method for the demodulation processes (using MMSE rate). QPSK (Quadrature Phase Shift Keying) is used for modulation of the transmission signal.

In the example illustrated in FIG. 3, the demodulation process is executed by using the MMSE method if $c^2$ is greater than or equal to 0.1, or executed by using the MLD method if $c^2$ is less than 0.1. The rate of use of the MMSE method for the demodulation process is about 0.6.

It can be seen in FIG. 3 that reception errors are reduced when executing the demodulation process by switching the MMSE method and the MLD method (Switch BERs), which is better than by using the MMSE method only (MMSE BERs). Also, the Switch BERs are similar to characteristics obtained when executing the demodulation process by using the MLD method only (MLD BERs). Specifically, only 0.3 dB of characteristic degradation is observed for the Switch BERs compared to the MLD BERs.

Figure 4:
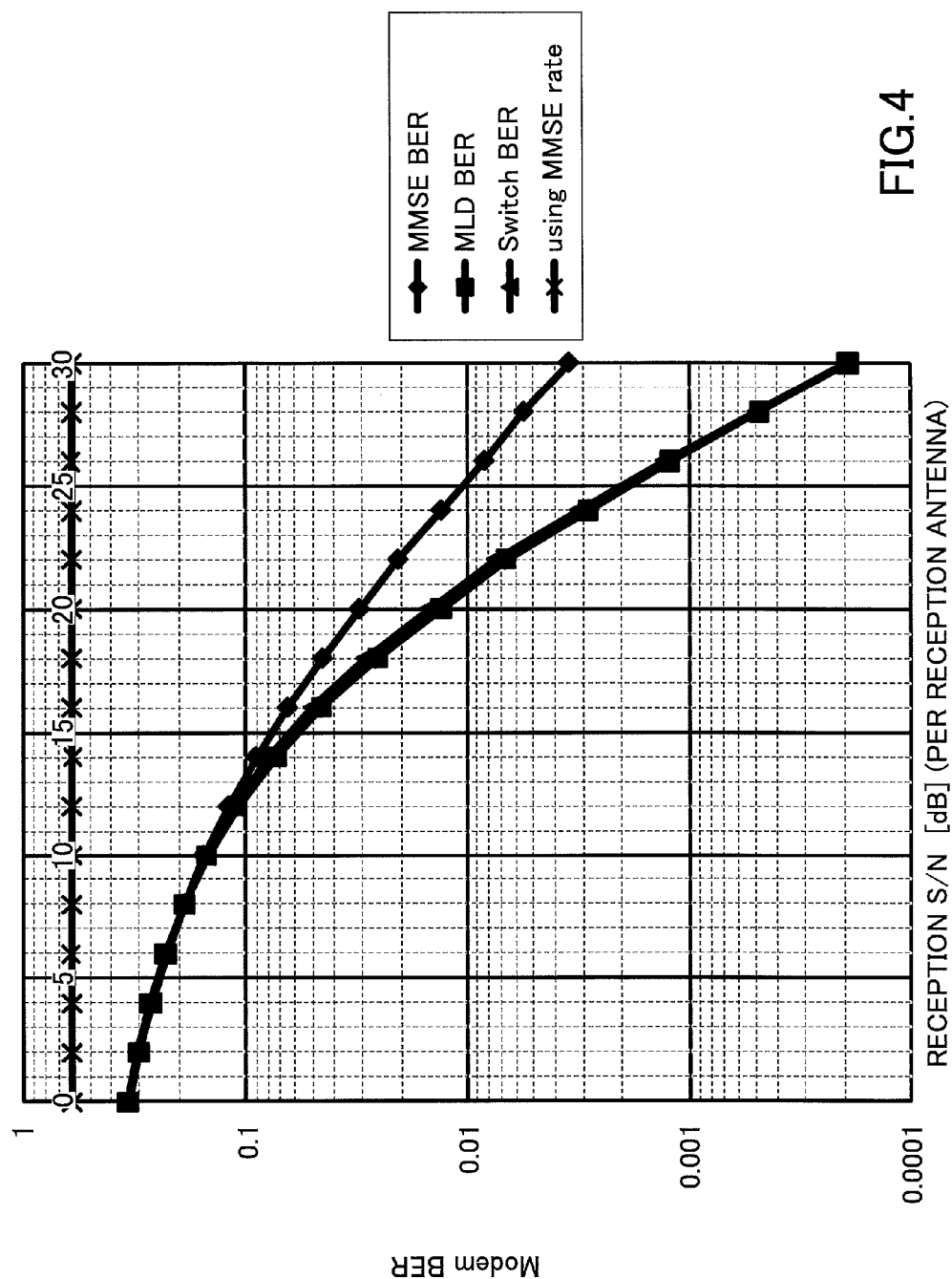
FIG. 4 is a schematic view illustrating an example of a relationship between reception S/N and reception errors when a demodulation process is switched between an MMSE method and a MLD method.

FIG. 4 illustrates another BER characteristic comparison that compares demodulation processes by using the MMSE method only, by using the MLD method only, and by switching the MMSE method and the MLD method based on $c^2$ where a transmission signal is modulated by 16QAM (Quadrature Amplitude Modulation). It is illustrated for a case where a signal is transmitted from two transmission antennas, which is then received by two reception antennas. FIG. 4 also illustrates a rate of using the MMSE method for the demodulation processes (using MMSE rate).

In the example illustrated in FIG. 4, the demodulation process is executed by using the MMSE method if $c^2$ is greater than or equal to 0.1, or executed by using the MLD method if $c^2$ is less than 0.1. The rate of use of the MMSE method for the demodulation process is about 0.6.

It can be seen in FIG. 4 that characteristics obtained when executing the demodulation process by switching the MMSE method and the MLD method (Switch BERs) is better than characteristics obtained when executing the demodulation process by using the MMSE method only (MMSE BERs) in terms of reception errors. Also, the Switch BERs are similar to characteristics obtained when executing the demodulation process by using the MLD method only (MLD BERs) where characteristic degradation is about 0.3 dB even for a worst case.

FIGS. 3-4 demonstrate that the amount of calculation can be reduced while avoiding characteristic degradation, by switching the demodulation process using the MMSE method and the demodulation process using the MLD method, based on information about transmission paths (propagation channels) obtained by executing channel estimation and the like.

<Demodulation Circuit 108>

Figure 5:
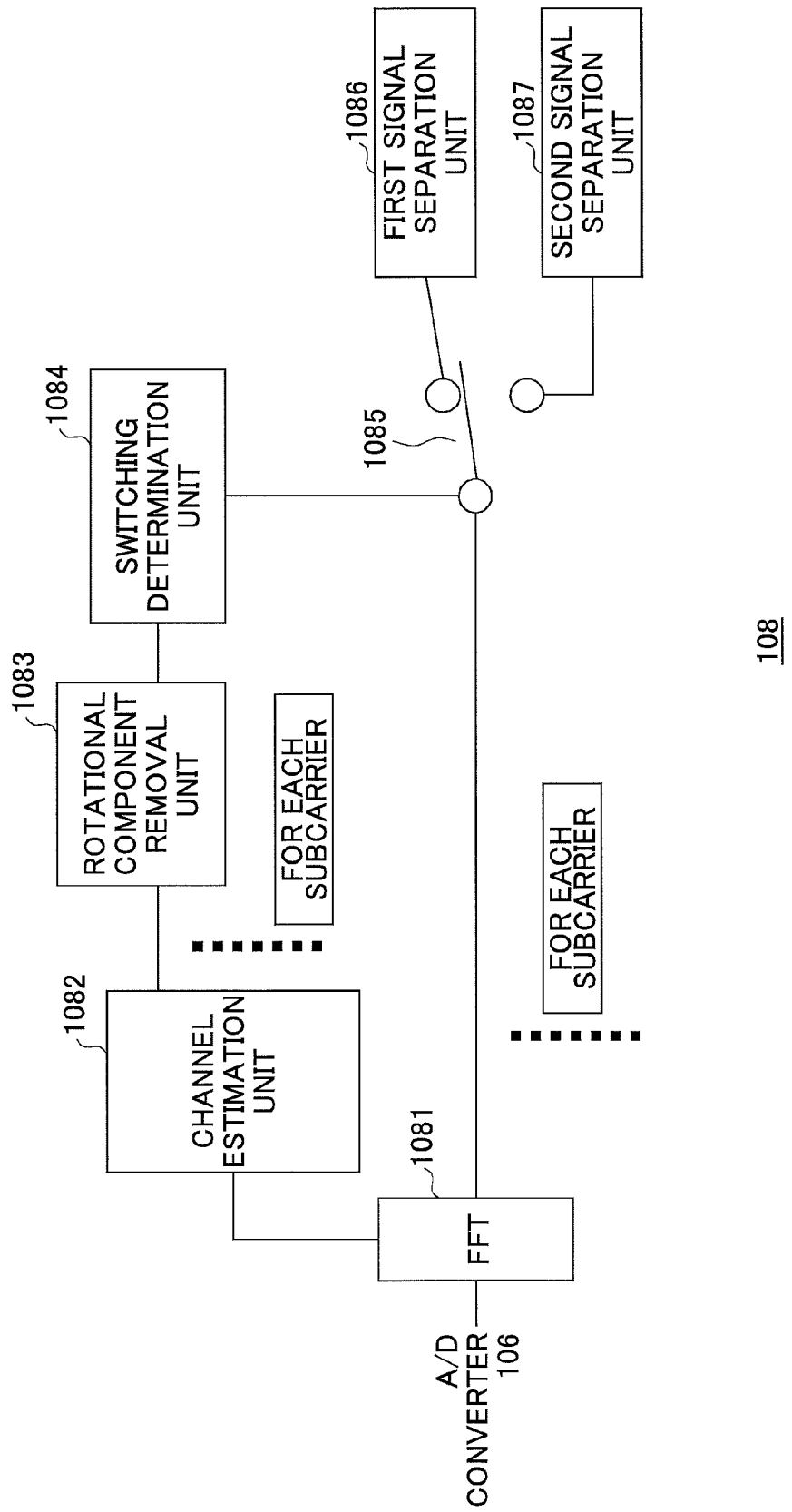
FIG. 5 is a schematic view illustrating an example of a demodulation circuit according to an embodiment.

FIG. 5 illustrates the demodulation circuit 108 according to the present embodiment.

The demodulation circuit 108 includes a fast Fourier transform units 1081, a channel estimation unit 1082, rotational component removal units 1083, switching determination units 1084, switches 1085, first signal separation units 1086, and second signal separation units 1087. The number of the rotational component removal units 1083, the switching determination units 1084, the switches 1085, the first signal separation units 1086, or the second signal separation units 1087 may be equal to the number of subcarriers or may be greater than the number of subcarriers. As an example, a part of the demodulation circuit 108 is illustrated in FIG. 5 that corresponds to a signal of one subcarrier (referred to as a "subcarrier signal" below).

Functions of the fast Fourier transform unit 1081, the channel estimation unit 1082, the rotational component removal unit 1083, the switch 1085, and the first and second signal separation units 1086-1087 can be implemented by hardware (digital circuits) or a processor such as a DSP (Digital Signal Processor). Also, functions of the switching determination unit 1084 can be implemented by, for example, firmware.

The fast Fourier transform unit 1081 is connected with the A/D converter 106. The fast Fourier transform unit 1081 separates a time-domain digital signal from the A/D converter 106 into subcarrier signals by converting the time-domain signal into frequency-domain signals.

The channel estimation unit 1082 is connected with the fast Fourier transform unit 1081. The channel estimation unit 1082 executes channel estimation that represents a characteristic of a transmission path between a transmission antenna and a reception antenna for each subcarrier signal based on the subcarrier signals from the fast Fourier transform unit 1081. For example, the channel estimation unit 1082 obtains a channel matrix for representing channel estimation values. The channel estimation unit 1082 inputs the channel matrix into the rotational component removal unit 1083. The channel estimation unit 1082 inputs the channel matrix that corresponds to a subcarrier signal into the rotational component removal unit 1083. The channel estimation unit 1082 also inputs the channel matrix into the first signal separation unit 1086 and the second signal separation unit 1087.

The rotational component removal unit 1083 is connected with the channel estimation unit 1082. The rotational component removal unit 1083 removes rotational components based on the channel matrix from the channel estimation unit 1082. Specifically, the rotational component removal unit 1083 obtains a matrix in which rotational components are removed based on the channel matrix from the channel estimation unit 1082. For example, when receiving a channel matrix H as input from the channel estimation unit 1082, the rotational component removal unit 1083 decomposes the channel matrix H into a matrix product of a unitary matrix (rotational components) and a matrix including other components. In this case, the rotational component removal unit 1083 may use QR decomposition. If using QR decomposition, the matrix having rotational components removed is an upper triangular matrix whose diagonal components are real numbers. The rotational component removal unit 1083 inputs information representing the matrix having rotational components removed into the switching determination unit 1084.

The switching determination unit 1084 is connected with the rotational component removal unit 1083. The switching determination unit 1084 determines which of the MLD method or the MMSE method is used for the demodulation process based on the matrix having rotational components removed from the rotational component removal unit 1083. Specifically, the switching determination unit 1084 determines which of the MLD method or the MMSE method is used for the demodulation process based on components of the matrix having rotational components removed. For example, the switching determination unit 1084 determines to execute the demodulation process by using the MLD method if the square of the value of the lower right component is less than 0.1 in the matrix having rotational components removed. If the square of the value of the lower right component is greater than or equal to 0.1, the switching determination unit 1084 determines to execute the demodulation process by using the MMSE method.

If determining to execute the demodulation process by using the MLD method, the switching determination unit 1084 outputs a switching signal to switch the output signal from the fast Fourier transform unit 1081, namely, the subcarrier signal, to be input into the first signal separation unit

1086. If determining to execute the demodulation process by using the MMSE method, the switching determination unit 1084 outputs a switching signal to switch the output signal from the fast Fourier transform unit 1081, namely, the subcarrier signal, to be input into the second signal separation unit 1087.

<Timing of Switching Determination #1>

The switching determination unit 1084 determines which of the MLD method or the MMSE method is used for the demodulation process at a predetermined timing.

Figure 6:
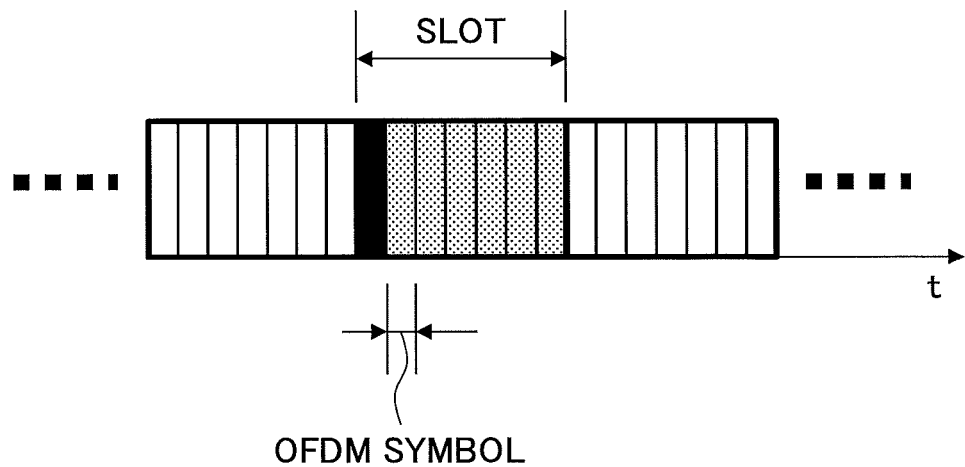
FIG. 6 is a schematic view illustrating an example of timing of switching determination between an MMSE method and an MLD method.

FIG. 6 illustrates an example of a timing when the switching determination unit 1084 determines which of the MLD method or the MMSE method is used for the demodulation process.

Ideally, it is preferable to determine which of the MLD method or the MMSE method is used for the demodulation process for all symbols. However, determining the algorithm used for the demodulation process for all symbols may not be adequate in terms of increased power consumption and processing load. Also, it can be assumed, in practice, that there are few cases where a propagation environment suddenly changes. Therefore, in the example illustrated in FIG. 6, switching is determined for each slot, rather than determined for each symbol. Also, it may be determined for slots interleaved by predetermined intervals.

If switching is determined for each slot, it may be determined with a predetermined symbol among multiple OFDM symbols included in the slot. Specifically, switching is determined with the leading OFDM symbol among seven OFDM symbols included in one slot. The determination result about the OFDM symbol used for switching determination is used for the other OFDM symbols. Namely, the demodulation process is executed for OFDM symbols other than the OFDM symbol used for switching determination, by the same algorithm as executed for the OFDM symbol used for switching determination.

In this way, the amount of processing can be reduced for switching determination.

<Timing of Switching Determination #2>

The switching determination unit 1084 determines which of the MLD method or the MMSE method is used for the demodulation process at a predetermined timing.

Figure 7:
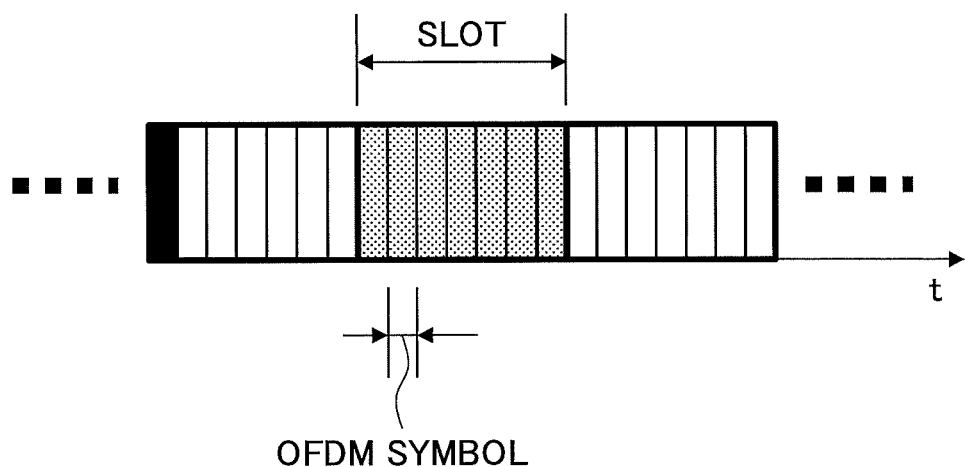
FIG. 7 is a schematic view illustrating an example of timing of switching determination between an MMSE method and an MLD method.

FIG. 7 illustrates an example of a timing when the switching determination unit 1084 determines which of the MLD method or the MMSE method is used for the demodulation process.

In the example illustrated in FIG. 7, switching is determined for each slot, rather than determined for each symbol. Also, it may be determined for slots interleaved by predetermined intervals.

If switching is determined for each slot, it may be determined with a predetermined symbol among multiple OFDM symbols included in another slot preceding the slot. Specifically, switching is determined with the leading OFDM symbol among seven OFDM symbols included in the other slot, and the determination result about the OFDM symbol used for switching determination is used for OFDM symbols in the following slot.

At the timing of switching determination #1, switching determination is executed for every seven OFDM symbols. Namely, switching determination is executed for the leading OFDM symbol of the seven OFDM symbols, and the switching itself is also executed. As the switching determination and the switching itself are executed around the same timing, the amount of calculation increases around this timing. On the other hand, if adopting the timing of switching determination #2, switching determination is executed beforehand with an OFDM symbol included in a slot that precedes the slot to which the switching determination is applied. For example, if switching determination is executed with the leading OFDM symbol in a slot that precedes the slot to which the switching determination is applied, the switching determination can take time for seven OFDM symbols. Therefore, calculation per unit time can be reduced.

The switch 1085 is connected with the fast Fourier transform unit 1081 and the switching determination unit 1084. Based on the switching signal from the switching determination unit 1084, the switch 1085 switches the subcarrier signal from the fast Fourier transform unit 1081 to be input into the first signal separation unit 1086 or the second signal separation unit 1087. The subcarrier signal is a subcarrier signal that corresponds to a channel matrix input from the channel estimation unit 1082 to the rotational component removal unit 1083.

The first signal separation unit 1086 is connected with the switch 1085. The first signal separation unit 1086 separates the subcarrier signal from the fast Fourier transform unit 1081 by the MLD method. The first signal separation unit 1086 separates the subcarrier signal from the fast Fourier transform unit 1081 by the MLD method using the channel matrix from the channel estimation unit 1082. When separating the subcarrier signal from the fast Fourier transform unit 1081 by the MLD method, the first signal separation unit 1086 may use a result of QR decomposition obtained by the rotational component removal unit 1083. A log likelihood ratio is calculated for each bit of the subcarrier signal having signal separation applied by the first signal separation unit 1086. Having calculated the log likelihood ratio, reliability information is added to a reception symbol, and soft-decision channel decoding is executed that uses the reception symbol having the reliability information added for decoding.

The second signal separation unit 1087 is connected with the switch 1085. The second signal separation unit 1087 applies an equalization process to the subcarrier signal from the fast Fourier transform unit 1081 by the MMSE method. The second signal separation unit 1087 applies the equalization process to the subcarrier signal from the fast Fourier transform unit 1081 by the MMSE method using the channel matrix from the channel estimation unit 1082. Interference from other antennas is suppressed in the subcarrier signal having the equalization process applied by the second signal separation unit 1087. A log likelihood ratio is calculated for each bit of the subcarrier signal having signal separation applied by the second signal separation unit 1087. Having calculated the log likelihood ratio, reliability information is added to a reception symbol, and soft-decision channel decoding is executed that uses the reception symbol having the reliability information added for decoding.

By executing the demodulation process by switching the MMSE method and the MLD method, the demodulation process is executed by using the MMSE method at least for a part of subcarrier signals. Therefore, an operation rate of the circuit can be reduced for signal separation using the MLD method, and the amount of calculation can be less than that required for the demodulation process using the MLD method for all subcarrier signals. By reducing the operation rate of the circuit for signal separation using the MLD method, power consumption can be reduced.

Although it has been described that an algorithm used for a signal separation process is selected from the MMSE method and the MLD method, other algorithms may be included in a selection for the decoding circuit 108 in the present embodiment. Specifically, a ZF (Zero-Forcing) method may be included in algorithms to be selected. Using the ZF method, a two-dimensional transmission vector x is detected by multiplying the inverse matrix ($H^{-1}$) of the channel matrix H to both sides of the formula (1).

<Operation of Wireless Communication Apparatus 100>

Figure 8:
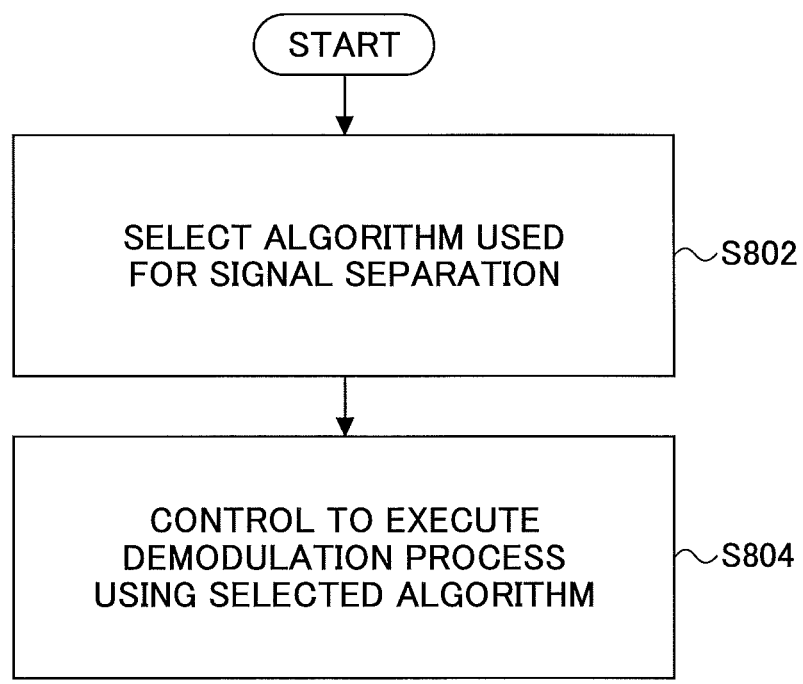
FIG. 8 is a schematic view illustrating an example of operation of a wireless communication apparatus according to an embodiment.

FIG. 8 illustrates operation of the wireless communication apparatus 100 according to the present embodiment. Operation by the switching determination unit 1084 is mainly illustrated in FIG. 8.

The wireless communication apparatus 100 selects an algorithm to be used for signal separation (Step S802). Namely, the switching determination unit 1084 determines which of the MLD method or the MMSE method is used for the demodulation process. The switching determination unit 1084 determines which of the MLD method or the MMSE method is used for the demodulation process, based on a matrix having rotational components removed that is obtained when the channel matrix H is decomposed into a matrix product of a unitary matrix representing rotational components and a matrix having rotational components removed from the channel matrix.

The wireless communication apparatus 100 controls the demodulation process so that the algorithm selected at Step S802 is used (Step S804). Namely, the wireless communication apparatus 100 controls the demodulation process so that the algorithm selected at Step S802 is used, by switching the switch 1085 depending on the algorithm selected at Step S802.

In the present embodiment, which of the MLD method or the MMSE method is used for the demodulation process may be determined for a part of subcarrier signals.

Figure 9:
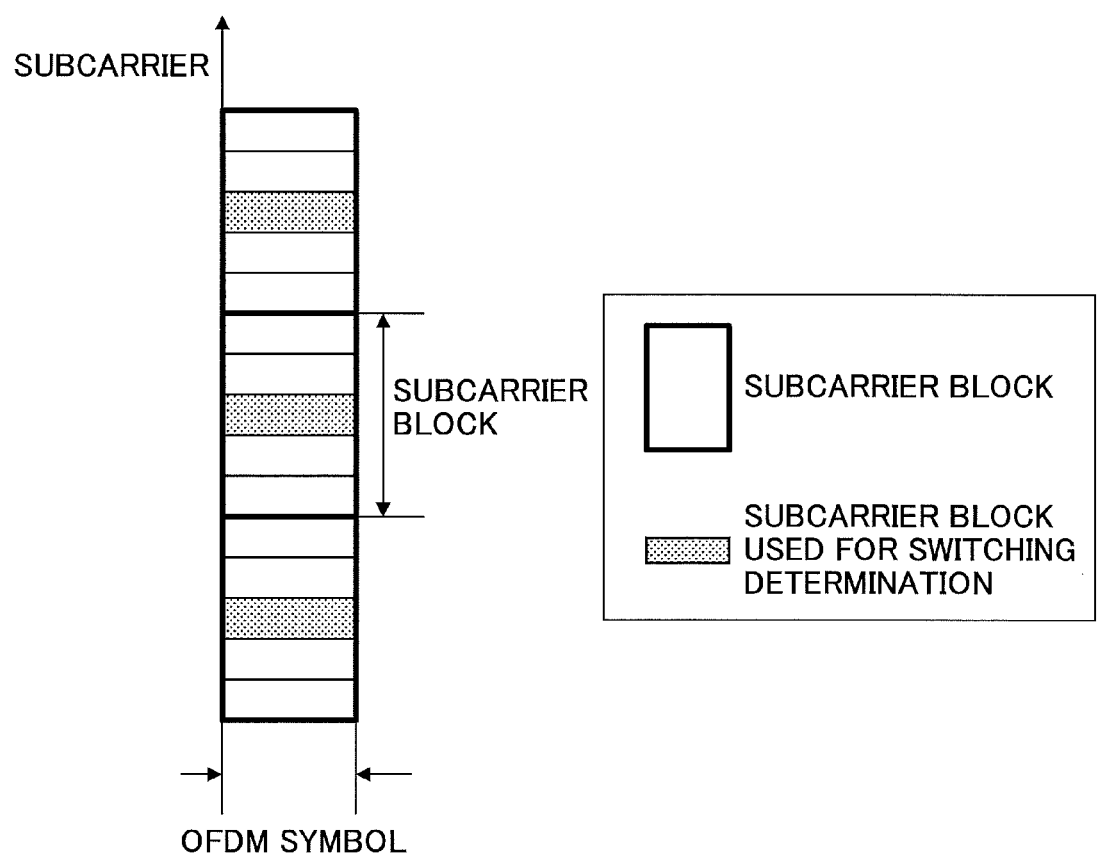
FIG. 9 is a schematic view illustrating an example of a subcarrier to be used for switching determination between an MMSE method and an MLD method.

FIG. 9 illustrates a process for determining which of the MLD method or the MMSE method is used for the demodulation process for a part of subcarrier signals. For subcarriers having close frequencies in a transmission path, it is assumed that the propagation channels are regarded as similar.

In the example illustrated in FIG. 9, multiple subcarriers are grouped together. Here, the grouped multiple subcarriers is called a "subcarrier block". Which of the MLD method or the MMSE method is used for the demodulation process is determined in units of subcarrier blocks. Specifically, which of the MLD method or the MMSE method is used for the demodulation process is determined by using a part of the subcarriers among the multiple subcarriers included in a subcarrier block. The determination result of the part of the subcarriers used for the determination is used for subcarriers other than the subcarriers used for the determination.

In the example illustrated in FIG. 9, a subcarrier block is formed with five subcarriers. Which of the MLD method or the MMSE method is used for the demodulation process is determined for units of subcarrier blocks. One of subcarriers included in a subcarrier block is used when determining which of the MLD method or the MMSE method is used for the demodulation process for units of subcarrier blocks. Multiple subcarriers included in a subcarrier block may be used when determining which of the MLD method or the MMSE method is used for the demodulation process for units of subcarrier blocks.

In the example illustrated in FIG. 5, one of the multiple switching determination units 1084, which are provided for respective subcarrier signals, is set to be used for switching determination for each subcarrier block. The switching determination unit 1084 used for the switching determination indicates a switching determination result to the other switching determination units 1084 that are associated with subcarriers included in the same subcarrier block.

In this way, the amount of processing can be reduced for switching determination.

Second Embodiment

Wireless Communication Apparatus

A wireless communication apparatus 100 in the present embodiment is substantially the same as the wireless communication apparatus described with reference to FIG. 1. A process executed by a demodulation circuit 108 differs from that of the wireless communication apparatus 100 illustrated in FIG. 1.

<Demodulation Circuit 108>

Figure 10:
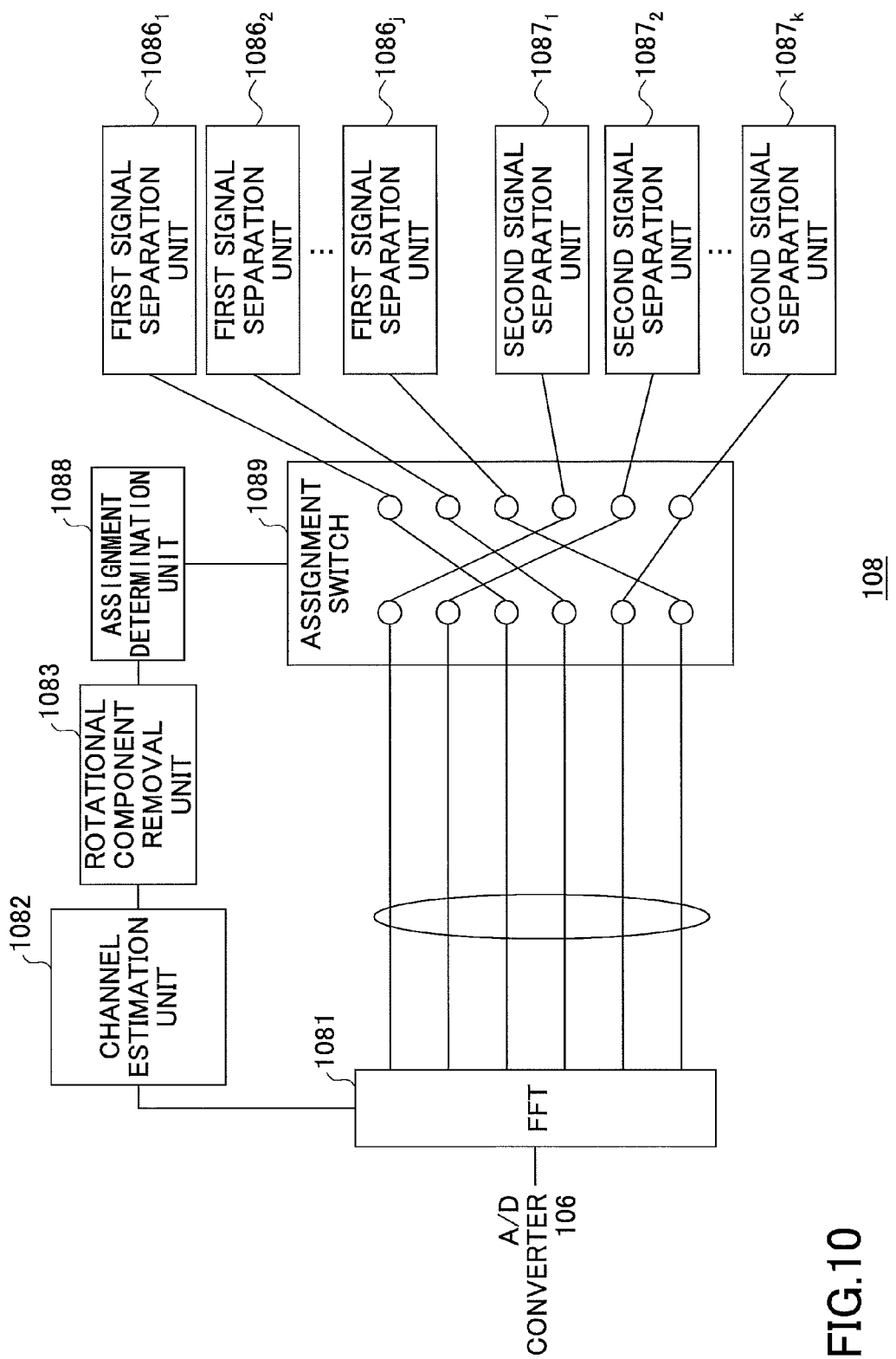
FIG. 10 is a schematic view illustrating an example of a demodulation circuit according to an embodiment.

FIG. 10 illustrates the demodulation circuit 108 according to the present embodiment.

The demodulation circuit 108 includes a fast Fourier transform unit 1081, a channel estimation unit 1082, a rotational component removal unit 1083, an assignment determination unit 1088, an assignment switch 1089, first signal separation units $1086_1$-$1086_j$ (j is an integer where 0<j), second signal separation units $1086_1$-$1087_k$ (k is an integer where 0<k). The sum of j and k may be equal to the number of subcarriers or may be greater than the number of subcarriers. It is preferable that the sum of j and k is less than twice of the number of subcarriers. Values of j and k are set beforehand.

Functions of the fast Fourier transform unit 1081, the channel estimation unit 1082, the rotational component removal unit 1083, the assignment switch 1089, and the first and second signal separation units $1086_1$-$1086_j$ and $1087_1$-$1087_k$ can be implemented by hardware (digital circuits) or a processor such as a DSP (Digital Signal Processor). Also, functions of the assignment determination unit 1088 can be implemented by, for example, firmware.

In multi-carrier communication, subcarriers have different transmission paths in general. Therefore, if a transmission bandwidth becomes greater, there may be transmission paths with which a better characteristic is obtained with the demodulation process using the MMSE method, and transmission paths with which a better characteristic is obtained with the demodulation process using the MLD method.

The assignment determination unit 1088 determines which of the MLD method or the MMSE method is used for the demodulation process based on a matrix having rotational components removed from the rotational component removal unit 1083 for each subcarrier. Specifically, the assignment determination unit 1088 determines which of the MLD method or the MMSE method is used for the demodulation process based on the matrix having rotational components removed from a channel matrix. For example, the assignment determination unit 1088 determines to execute the demodulation process by using the MLD method if the square of the value of the lower right component is less than 0.1 in the matrix having rotational components removed from the channel matrix. The assignment determination unit 1088 may determine to execute the demodulation process by using the MLD method if the absolute value of the value of the lower right component is less than 0.1. If the square of the value of the lower right component is greater than or equal to 0.1, the switching determination unit 1084 determines to execute the demodulation process by using the MMSE method. The assignment determination unit 1088 may determine to execute the demodulation process by using the MLD method if the absolute value of the value of the lower right component is greater than or equal to 0.1.

If determining to execute the demodulation process by using the MLD method, the assignment determination unit 1088 outputs an assignment signal to switch the output signal from the fast Fourier transform unit 1081 to be input into the first signal separation unit $1086_j$.

If determining to execute the demodulation process by using the MLD method, the assignment determination unit 1088 outputs an assignment signal to switch the output signal from the fast Fourier transform unit 1081 to be input into the second signal separation unit 1087$_k$.

The assignment switch 1089 is connected with the fast Fourier transform unit 1081 and the assignment determination unit 1088. Based on the assignment signal from the assignment determination unit 1088, the assignment switch 1089 switches the subcarrier signal from the fast Fourier transform unit 1081 to be input into the first signal separation unit 1086$_j$ or the second signal separation unit 1087$_k$.

The first signal separation unit 1086$_j$ is connected with the assignment switch 1089. The first signal separation unit 1086$_j$ separates the subcarrier signal from the fast Fourier transform unit 1081 by the MLD method. The first signal separation unit 1086$_j$ separates the subcarrier signal from the fast Fourier transform unit 1081 by the MLD method using the channel matrix from the channel estimation unit 1082. When separating the subcarrier signal from the fast Fourier transform unit 1081 by the MLD method, the first signal separation unit 1086$_j$ may use a result of QR decomposition obtained by the rotational component removal unit 1083. A log likelihood ratio is calculated for each bit of the subcarrier signal having signal separation applied by the first signal separation unit 1086$_j$. Having calculated the log likelihood ratio, reliability information is added to a reception symbol, and soft-decision channel decoding is executed that uses the reception symbol having the reliability information added for decoding.

The second signal separation unit 1087$_k$ is connected with the assignment switch 1089. The second signal separation unit 1087$_k$ applies an equalization process to the subcarrier signal from the fast Fourier transform unit 1081 by the MMSE method. The second signal separation unit 1087$_k$ applies the equalization process to the subcarrier signal from the fast Fourier transform unit 1081 by the MMSE method using the channel matrix from the channel estimation unit 1082. Interference from other antennas is suppressed in the subcarrier signal having the equalization process applied by the second signal separation unit 1087$_k$. A log likelihood ratio is calculated for each bit of the subcarrier signal having signal separation applied by the second signal separation unit 1087$_k$. Having calculated the log likelihood ratio, reliability information is added to a reception symbol, and soft-decision channel decoding is executed that uses the reception symbol having the reliability information added for decoding.

The first signal separation units 1086$_j$ that execute the demodulation process by using the MLD method, and the second signal separation units 1087$_k$ that execute the demodulation process by using the MMSE method are provided beforehand. A subcarrier signal from the fast Fourier transform unit 1081 is assigned to one of the first signal separation units 1086$_j$ and the second signal separation units 1087$_k$. In this way, the number of the first signal separation units 1086$_j$ and the second signal separation units 1087$_k$ can be reduced, which also reduces the circuit size to be smaller than that of the wireless communication apparatus 100 in the first embodiment.

Although it has been described that an algorithm used for a signal separation process is selected from the MMSE method and the MLD method, other algorithms may be included in a selection for the decoding circuit 108 in the present embodiment. Specifically, a ZF (Zero-Forcing) method may be included in algorithms to be selected.

Also, the assignment determination unit 1088 may determine assignment based on the method described with the timing of switching determination #1 or the timing of switching determination #2.

<Operation of Wireless Communication Apparatus 100>

Operation of the wireless communication apparatus 100 in the present embodiment is substantially the same as the operation described with reference to FIG. 8. However, Step 804 is processed differently. At Step S804, when controlling the demodulation process so that the selected algorithm is used, it is executed based on an assignment signal from the assignment determination unit 1088. Namely, the assignment switch 1089 controls the demodulation process so that the selected algorithm is used, based on the assignment signal from the assignment determination unit 1088.

In the present embodiment, which of the MLD method or the MMSE method is used for the demodulation process may be determined for a part of the subcarrier signals.

FIG. 9 illustrates a process for determining which of the MLD method or the MMSE method is used for the demodulation process for a part of the subcarrier signals. For subcarriers having close frequencies in a transmission path, it is assumed that the propagation channels are regarded as similar.

Which of the MLD method or the MMSE method is used for the demodulation process is determined in units of subcarrier blocks. Specifically, which of the MLD method or the MMSE method is used for the demodulation process is determined by using a part of the subcarriers among the multiple subcarriers included in a subcarrier block. The determination result of the part of the subcarriers used for the determination is used for subcarriers other than the subcarriers used for the determination.

For example, in the example illustrated in FIG. 9, a subcarrier block is formed with five subcarriers. Which of the MLD method or the MMSE method is used for the demodulation process is determined for units of subcarrier blocks. One of subcarriers included in a subcarrier block is used when determining which of the MLD method or the MMSE method is used for the demodulation process for units of subcarrier blocks. Multiple subcarriers included in a subcarrier block may be used for the determination.

The assignment determination unit 1088 determines which of the MLD method or the MMSE method is used for the demodulation process by units of subcarrier blocks, using a predetermined subcarrier signal included in a subcarrier block. The assignment determination unit 1088 uses the determination result of the predetermined subcarrier signal for subcarrier signals other than the predetermined subcarrier signal, and assigns the other subcarrier signals to the same one of the first signal separation units 1086$_j$ and the second signal separation units 1087$_k$.

<First Modified Example of Assignment Determination Unit 1088>

Figure 11:
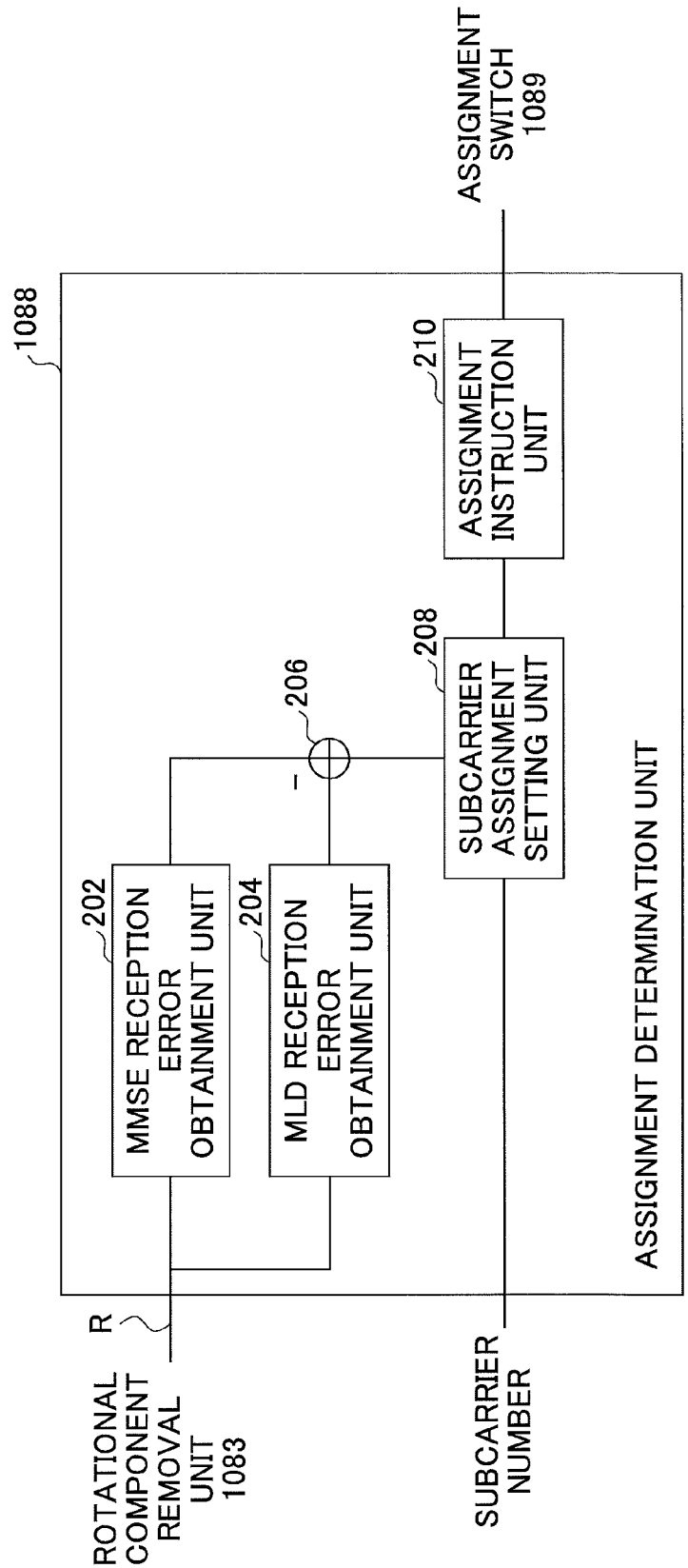
FIG. 11 is a schematic view illustrating an example of an assignment determination unit according to an embodiment.

FIG. 11 illustrates a first modified example of the assignment determination unit 1088.

The assignment determination unit 1088 includes an MMSE reception error obtainment unit 202, an MLD reception error obtainment unit 204, an adder 206, a subcarrier assignment setting unit 208, and an assignment instruction unit 210.

In the present modified example of the assignment determination unit 1088, it is assumed that distribution of error rates has been obtained beforehand for algorithms to be used for signal separation.

Figure 12:
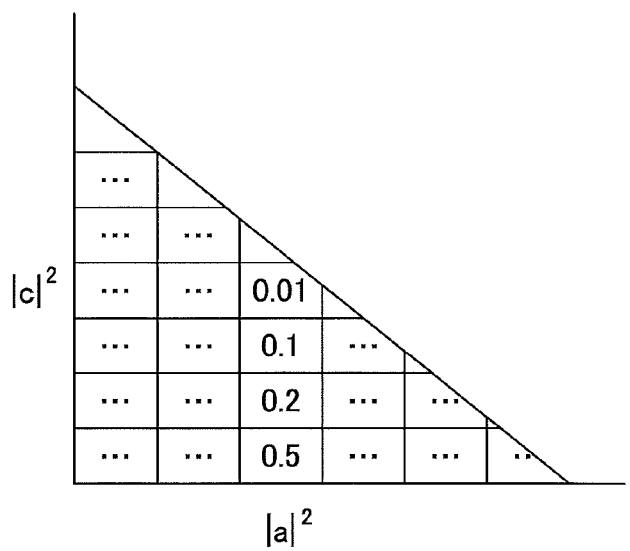
FIG. 12 is a schematic view illustrating an example of a relationship between a propagation environment and reception error rates.
Figure 13:
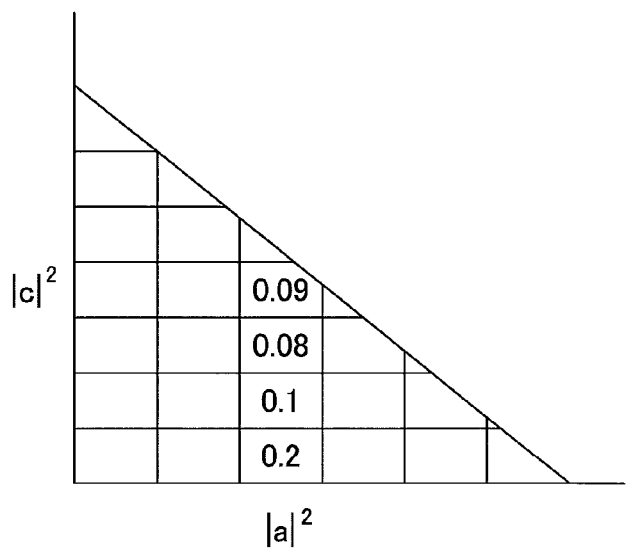
FIG. 13 is a schematic view illustrating an example of a relationship between a propagation environment and reception error rates.

FIGS. 12-13 illustrate relationships between propagation environments and the reception error rate, respectively. Distribution of reception error rates is illustrated in FIGS. 12-13 that is obtained while changing transmission paths. If S/N is known, distribution of error rates can be obtained following the relationship between an environment and reception error that has been described with reference to FIG. 2.

FIG. 12 illustrates an example of distribution of reception error rates when executing the demodulation process by using the MMSE method. Values in FIG. 12 are examples, and may take different values depending on S/N.

FIG. 13 illustrates an example of distribution of reception error rates when executing the demodulation process by using the MLD method. Values in FIG. 13 are examples, and may take different values depending on S/N.

The MMSE reception error obtainment unit 202 is connected with the rotational component removal unit 1083. The MMSE reception error obtainment unit 202 obtains a reception error rate of the demodulation process using the MMSE method based on a matrix obtained by removing rotational components from a channel matrix from the rotational component removal unit 1083. Specifically, an MMSE reception error table illustrated in FIG. 12 is stored in the MMSE reception error obtainment unit 202. The MMSE reception error obtainment unit 202 obtains a reception error rate based on diagonal components "a" and "c" included in information that represents the matrix obtained by removing rotational components from the channel matrix from the rotational component removal unit 1083.

For example, "0.5" may be obtained as the reception error rate from the MMSE reception error table illustrated in FIG. 12. The MMSE reception error obtainment unit 202 inputs the reception error rate obtained from the MMSE reception error table into the adder 206. The MMSE reception error obtainment unit 202 inverts the sign when inputting the reception error rate obtained from the MMSE reception error table into the adder 206.

The MLD reception error obtainment unit 204 is connected with the rotational component removal unit 1083. The MLD reception error obtainment unit 204 obtains a reception error rate of the demodulation process using the MMSE method based on a matrix obtained by removing rotational components from a channel matrix from the rotational component removal unit 1083. Specifically, an MLD reception error table illustrated in FIG. 13 is stored in the MLD reception error obtainment unit 204. The MLD reception error obtainment unit 204 obtains a reception error rate based on diagonal components "a" and "c" included in information that represents the matrix obtained by removing rotational components from the channel matrix from the rotational component removal unit 1083.

For example, "0.2" may be obtained as the reception error rate from the MLD reception error table illustrated in FIG. 13. The MLD reception error obtainment unit 204 inputs the reception error rate obtained from the MLD reception error table into the adder 206.

The adder 206 is connected with the MMSE reception error rate obtainment unit 202 and the MLD reception error obtainment unit 204. The adder 206 adds the reception error rate having the sign inverted from the MMSE reception error obtainment unit 202, and the reception error rate from the MLD reception error obtainment unit 204. The adder 206 inputs the added value of the reception error rate having the sign inverted from the MMSE reception error obtainment unit 202, and the reception error rate from the MLD reception error obtainment unit 204 (referred to as the "added value" below) into the subcarrier assignment setting unit 208.

The subcarrier assignment setting unit 208 is connected with the adder 206. Also, the subcarrier assignment setting unit 208 receives as input information that represents subcarrier numbers. The subcarrier assignment setting unit 208 sorts the information that represents subcarrier numbers based on the added value from the adder 206. A subcarrier number is a number that represents a subcarrier signal corresponding to a matrix obtained by removing rotational components from a channel matrix, which is input from the rotational component removal unit 1083 to the assignment determination unit 1088. Namely, the added value is obtained for every subcarrier signal. The subcarrier assignment setting unit 208 may sort the added values in descending order.

By sorting the information that represents subcarrier numbers, the first signal separation units $1086_j$ and the second signal separation units $1087_k$ are set up to be assigned the subcarriers. The subcarrier assignment setting unit 208 inputs information that represents the order of the subcarrier numbers obtained by sorting the information that represents subcarrier numbers to the assignment instruction unit 210.

The assignment instruction unit 210 generates an assignment signal to indicate subcarrier assignment to the assignment switch 1089 based on information that represents the order of the subcarrier numbers from the subcarrier assignment setting unit 208. The assignment instruction unit 210 inputs the assignment signal to the assignment switch 1089.

According to the present modified example, the first signal separation units $1086_j$ that execute the demodulation process using the MLD method are assigned subcarriers that have the first to j-th greatest differences between the reception error rate obtained with the demodulation process using the MMSE method and the reception error rate obtained with the demodulation process using the MLD method. The (j+1)-th to (j+k)-th greatests are assigned to the second signal separation units $1087_k$ that execute the demodulation process using the MMSE method. It is assumed that a propagation environment gets closer to that with smaller $c^2$ as illustrated in FIG. 2 if the difference gets greater between the reception error rate obtained with the demodulation process using the MMSE method and the reception error rate obtained with the demodulation process using the MLD method. In this case, the demodulation process is executed by using the MLD method.

On the other hand, it is also assumed that a propagation environment gets closer to that with greater $c^2$ as illustrated in FIG. 2 if the differences gets smaller between the reception error rate obtained with the demodulation process using the MMSE method and the reception error rate obtained with the demodulation process using the MLD method. In this case, the demodulation process is executed using the MMSE method.

<Operation of Wireless Communication Apparatus 100>

Figure 14:
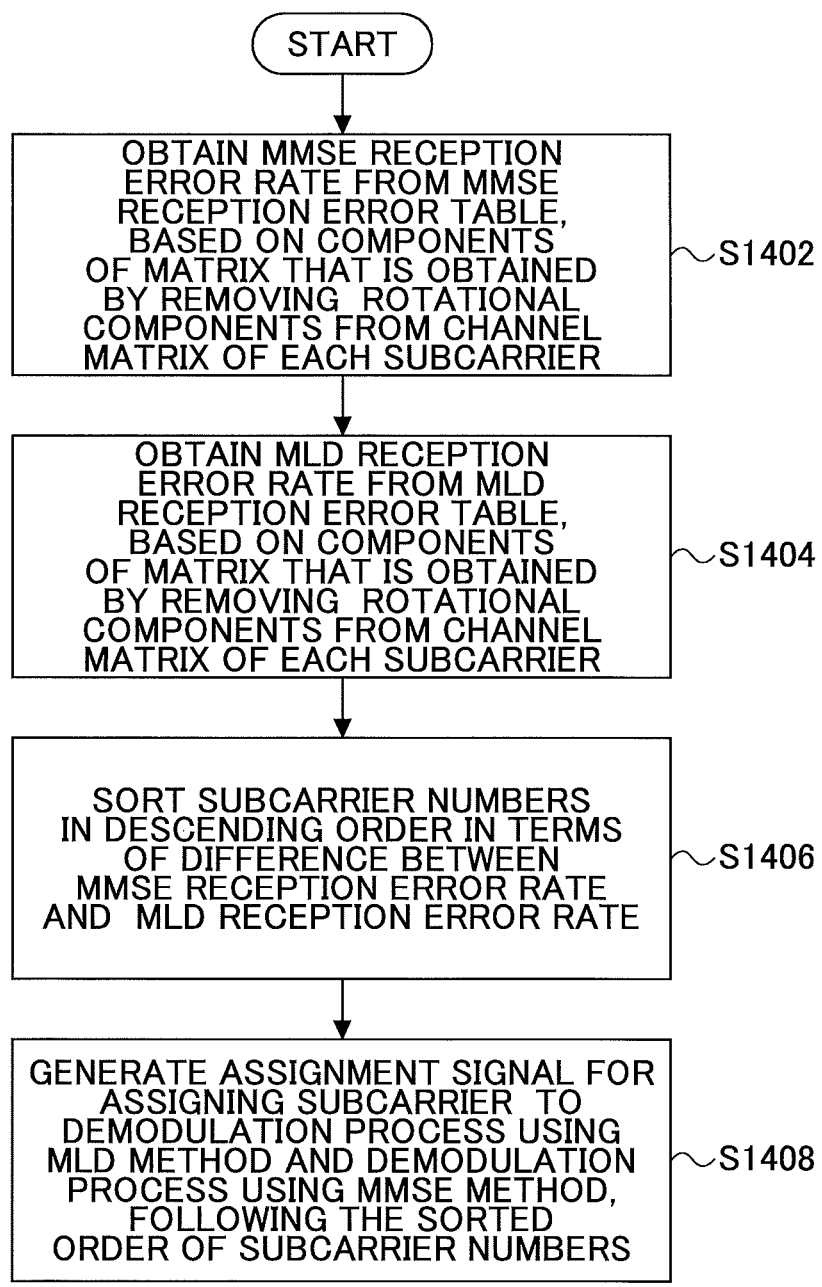
FIG. 14 is a schematic view illustrating an example of operation of a wireless communication apparatus according to an embodiment.

FIG. 14 illustrates operation of the wireless communication apparatus 100 according to the present modified example. Operation by the assignment determination unit 1088 is mainly illustrated in FIG. 14.

The wireless communication apparatus 100 obtains an MMSE reception error rate from the MMSE reception error table, based on components of a matrix that is obtained by removing rotational components from a channel matrix of each subcarrier (Step S1402). Namely, the MMSE reception error obtainment unit 202 obtains an MMSE reception error rate from the MMSE reception error table, based on elements "a" and "c" in the matrix obtained by removing rotational components from the channel matrix.

The wireless communication apparatus 100 obtains an MLD reception error rate from the MLD reception error table, based on components of a matrix that is obtained by removing rotational components from a channel matrix of each subcarrier (Step S1404). Namely, the MLD reception error obtainment unit 204 obtains an MLD reception error rate from the MLD reception error table, based on elements "a" and "c" in the matrix obtained by removing rotational components from the channel matrix.

The wireless communication apparatus 100 sorts subcarrier numbers in descending order in terms of the difference between an MMSE reception error rate and an MLD reception error rate (Step S1406). Namely, the adder 206 adds an MMSE reception error rate that is obtained by the MMSE reception error obtainment unit 202 and has the sign inverted, and an MLD reception error rate that is obtained by the MLD reception error obtainment unit 204. Subcarrier numbers corresponding to the added values obtained by the adder 206 are sorted by the subcarrier assignment setting unit 208 in descending order of the added values.

The wireless communication apparatus 100 assigns subcarriers to the demodulation process using the MLD method and the demodulation process using the MMSE method, following the sorted order of subcarrier numbers (Step S1408). Namely, the assignment instruction unit 210 generates an assignment signal for assigning subcarriers, following the information that represents the sorted order of subcarrier numbers. The assignment instruction unit 210 inputs the assignment signal to the assignment switch 1089.

Algorithms other than the MMSE method and the MLD method may be included in a selection of an algorithm to be used for the signal separation process. Specifically, a ZF (Zero-Forcing) method may be included in algorithms to be selected.

Also, the process of the assignment determination unit 1088 may be used for the switching determination unit 1084 in the first embodiment. In this case, a threshold value is set for the added value so that the switching determination unit 1084 outputs the switching signal to be processed by the first signal separation unit 1086 if the added value is greater than or equal to the threshold value, or the switching determination unit 1084 outputs the switching signal to be processed by the second signal separation unit 1087 if the added value is less than the threshold value.

<Second Modified Example of Assignment Determination Unit 1088>

Figure 15:
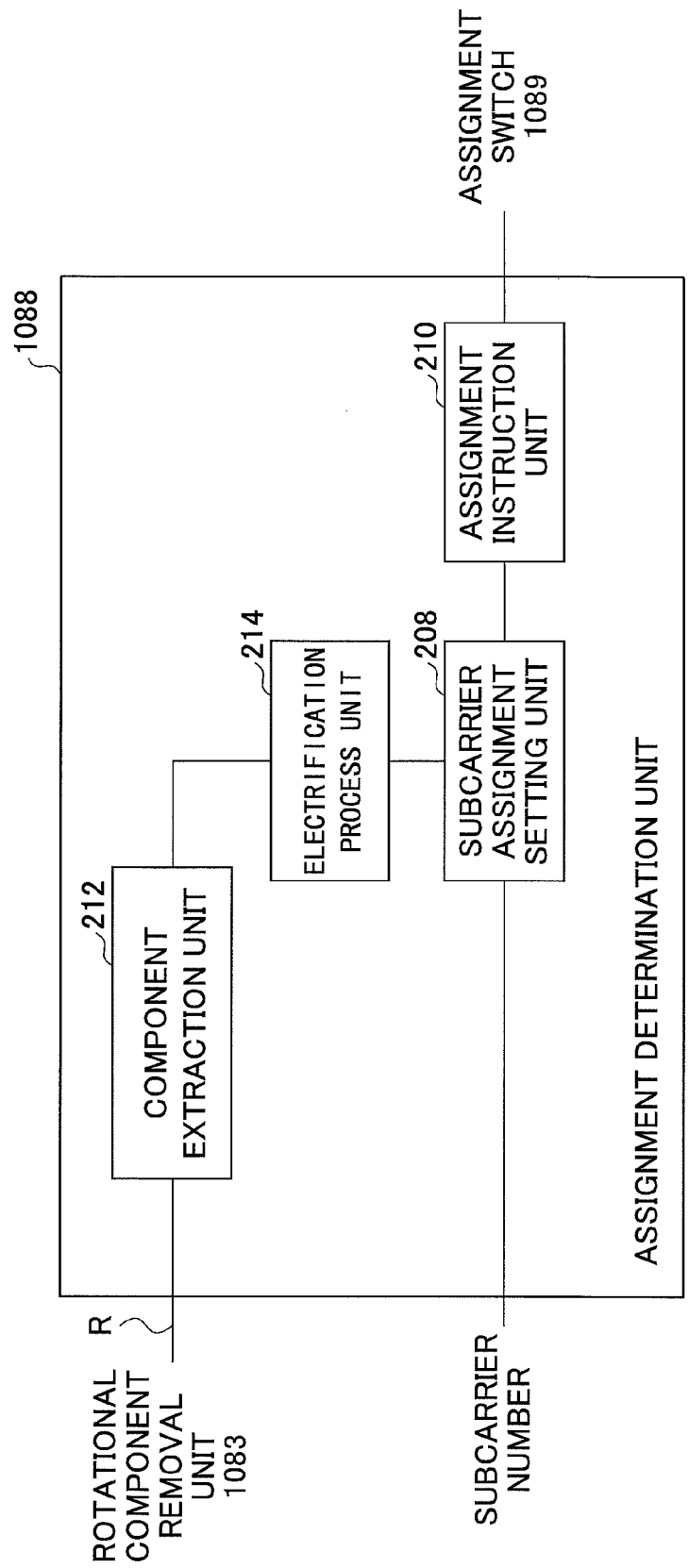
FIG. 15 is a schematic view illustrating an example of an assignment determination unit according to an embodiment.

FIG. 15 illustrates a second modified example of the assignment determination unit 1088.

The assignment determination unit 1088 includes a component extraction unit 212, an electrification process unit 214, a subcarrier assignment setting unit 208, and an assignment instruction unit 210.

The component extraction unit 212 is connected with the rotational component removal unit 1083. The component extraction unit 212 obtains a predetermined component based on a matrix obtained by removing rotational components from a channel matrix from the rotational component removal unit 1083. Specifically, the component extraction unit 212 obtains one of the diagonal components "c" included in information that represents the matrix obtained by removing rotational components from the channel matrix. The component extraction unit 212 inputs information that represents the obtained component (referred to as the "obtained component" below) into the electrification process unit 214.

The electrification process unit 214 is connected with the component extraction unit 212. The electrification process unit 214 executes an electrification process by calculating the square of the information that represents the obtained component from the component extraction unit 212. The electrification process unit 214 may execute the electrification process by taking the absolute value of the obtained component from the component extraction unit 212. The electrification process unit 214 inputs the information that represents the obtained component having the electrification process applied into the subcarrier assignment setting unit 208.

The subcarrier assignment setting unit 208 is connected with the electrification process unit 214. Also, the subcarrier assignment setting unit 208 receives as input, information that represents subcarrier numbers. The subcarrier assignment setting unit 208 sorts the information that represents subcarrier numbers based on the information that represents the obtained component having the electrification process applied. A subcarrier number is a number that represents a subcarrier signal corresponding to a matrix obtained by removing rotational components from a channel matrix, which is input from the rotational component removal unit 1083 to the assignment determination unit 1088. Namely, the obtained component having the electrification process applied is obtained for every subcarrier signal.

The subcarrier assignment setting unit 208 may sort the obtained component having the electrification process applied in ascending order. By sorting the information that represents subcarrier numbers, the first signal separation units $1086_j$ and the second signal separation units $1087_k$ are set to have the subcarriers assigned. The subcarrier assignment setting unit 208 inputs information that represents the order of the subcarrier numbers obtained by sorting the information that represents subcarrier numbers to the assignment instruction unit 210.

The assignment instruction unit 210 generates an assignment signal to indicate subcarrier assignment to the assignment switch 1089 based on information that represents the order of the subcarrier numbers from the subcarrier assignment setting unit 208. The assignment instruction unit 210 inputs the assignment signal to the assignment switch 1089.

A tendency can be seen in FIGS. 12-13 that a BER (Bit Error Rates) is greater for a smaller value of the absolute value of the component "c" included in a matrix obtained by removing rotational components from a channel matrix. In addition, another tendency can be seen that the difference between a BER of a demodulation process using the MMSE method and a BER of a demodulation process using the MLD method is greater for a smaller value of the absolute value of the component c.

According to the present modified example, subcarriers are sorted in ascending order of the absolute value of the component "c" included in a matrix obtained by removing rotational components from a channel matrix. The first signal separation units $1086_j$ are assigned subcarriers that have the first to j-th least absolute values of the component c. The (j+1)-th to (j+k)-th leasts are assigned to the second signal separation units $1087_k$. In this way, the demodulation process using the MMSE method and the demodulation process using the MLD method can be effectively used.

<Operation of Wireless Communication Apparatus 100>

Figure 16:
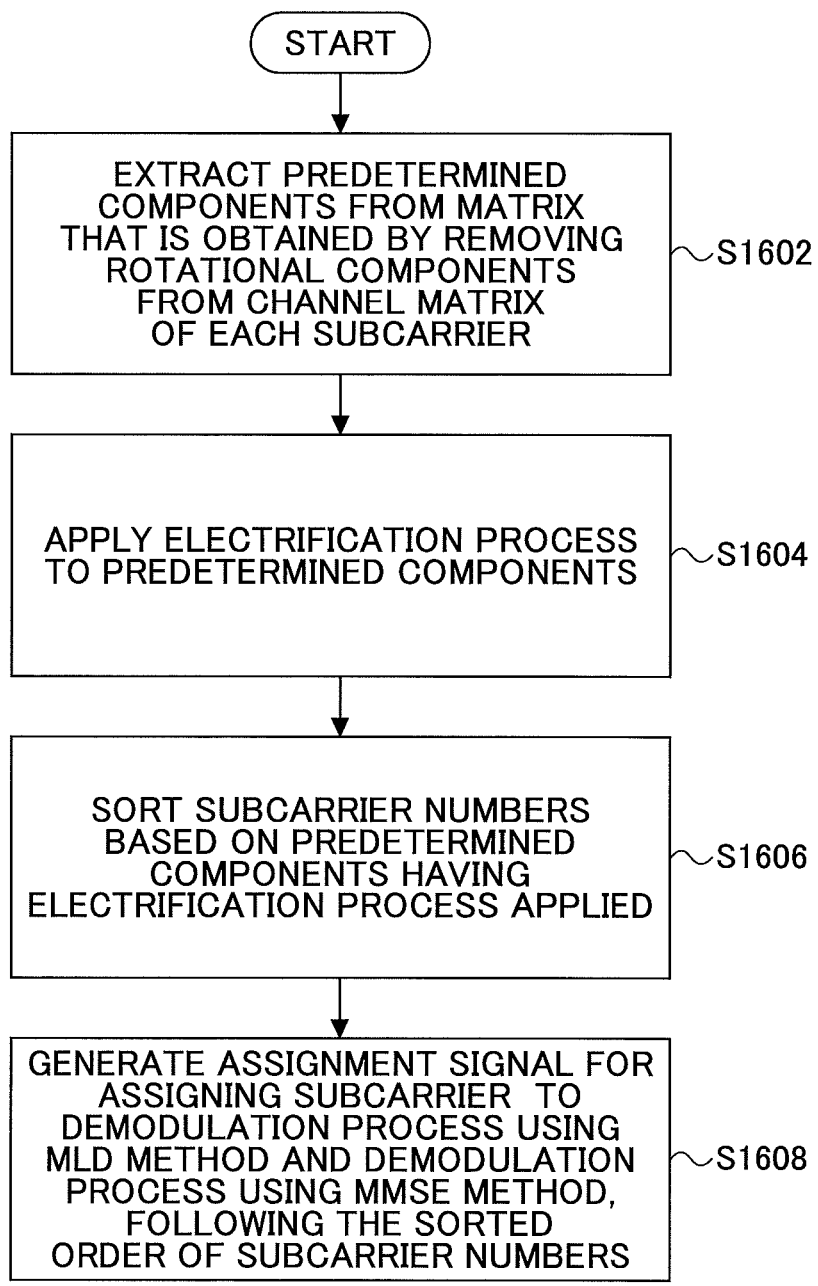
FIG. 16 is a schematic view illustrating an example of operation of a wireless communication apparatus according to an embodiment.

FIG. 16 illustrates operation of the wireless communication apparatus 100 according to the present modified example. Operation by the assignment determination unit 1088 is mainly illustrated in FIG. 16.

The wireless communication apparatus 100 extracts a predetermined component from a matrix obtained by removing rotational components from a channel matrix for each subcarrier (Step S1602). Namely, the component extraction unit 212 extracts the component "c" from the matrix obtained by removing rotational components from the channel matrix.

The wireless communication apparatus 100 executes an electrification process for the predetermined component obtained at Step S1602 (Step S1604). Namely, the electrification process unit 214 executes the electrification process by calculating the square of the component c. Instead of the square of the component "c", the absolute value of the component "c" may be obtained.

The wireless communication apparatus 100 sorts subcarrier numbers based on values of the predetermined components having the electrification process applied (Step S1606). Namely, the subcarrier assignment setting unit 208 sorts subcarrier numbers in descending order of the square of the component c.

The wireless communication apparatus 100 assigns subcarriers to the demodulation process using the MLD method and the demodulation process using the MMSE method, following the order of subcarrier numbers sorted at S1606 (Step S1608). Namely, the assignment instruction unit 210 generates an assignment signal for assigning subcarriers, following the information that represents the sorted order of subcarrier numbers. The assignment instruction unit 210 inputs the assignment signal to the assignment switch 1089.

Algorithms other than the MMSE method and the MLD method may be included in a selection of an algorithm to be used for the signal separation process. Specifically, a ZF (Zero-Forcing) method may be included in algorithms to be selected.

Also, the process of the assignment determination unit 1088 may be used for the switching determination unit 1084 in the first embodiment. In this case, a threshold value is set for the absolute value of the component "c" so that the switching determination unit 1084 outputs the switching signal to be processed by the first signal separation unit 1086 if the absolute value is less than the threshold value, or the switching determination unit 1084 outputs the switching signal to be processed by the second signal separation unit 1087 if the absolute value is greater than or equal to the threshold value.

<Third Modified Example of Assignment Determination Unit 1088>

An assignment determination unit 1088 in the present modified example is substantially the same as that described with reference to FIG. 15.

The component extraction unit 212 is connected with the rotational component removal unit 1083. The component extraction unit 212 obtains predetermined components based on a matrix obtained by removing rotational components from a channel matrix from the rotational component removal unit 1083. Specifically, the component extraction unit 212 obtains diagonal components "a" and "c" included in information that represents the matrix obtained by removing rotational components from the channel matrix. The component extraction unit 212 inputs information that represents the obtained components into the electrification process unit 214.

The electrification process unit 214 executes an electrification process by dividing the component "a" by the component "c", and then calculating the square of the quotient. The electrification process unit 214 may execute the electrification process by dividing the component "a" by the component "c", and then taking the absolute value of the quotient. The electrification process unit 214 inputs the information that represents the obtained components having the electrification process applied into the subcarrier assignment setting unit 208.

The subcarrier assignment setting unit 208 sorts the information that represents subcarrier numbers based on the information that represents the obtained components having the electrification process applied from the electrification process unit 214. A subcarrier number is a number that represents a subcarrier signal corresponding to a matrix obtained by removing rotational components from a channel matrix, which is input from the rotational component removal unit 1083 to the assignment determination unit 1088. Namely, the obtained components having the electrification process applied are obtained for every subcarrier signal. The subcarrier assignment setting unit 208 may sort the obtained components having the electrification process applied in descending order. By sorting the information that represents subcarrier numbers, the first signal separation units 1086$_j$ and the second signal separation units 1087$_k$ are set to have the subcarriers assigned. The subcarrier assignment setting unit 208 inputs information that represents the order of the subcarrier numbers obtained by sorting the information that represents subcarrier numbers to the assignment instruction unit 210, The assignment instruction unit 210 generates an assignment signal to indicate subcarrier assignment to the assignment switch 1089 based on information that represents the order of the subcarrier numbers from the subcarrier assignment setting unit 208. The assignment instruction unit 210 inputs the assignment signal to the assignment switch 1089.

According to the present modified example, subcarriers are sorted in descending order of the absolute value of the quotient which is obtained by dividing the component "a" by the component "c" included in a matrix obtained by removing rotational components from a channel matrix. The first signal separation units 1086$_j$ are assigned for subcarriers that have the first to j-th greatest absolute values of the quotients. The (j+1)-th to (j+k)-th greatests are assigned to the second signal separation units 1087$_k$. In this way, the demodulation process using the MMSE method and the demodulation process using the MLD method can be effectively used.

<Operation of Wireless Communication Apparatus 100>

Operation of a wireless communication apparatus 100 according to the present modified example is substantially the same as the operation described with reference to FIG. 16.

At Step S1602, the wireless communication apparatus 100 extracts predetermined components from a matrix obtained by removing rotational components from a channel matrix for each subcarrier. Namely, the component extraction unit 212 extracts the components "a" and "c" from the matrix obtained by removing rotational components from the channel matrix for each subcarrier.

At Step S1604, the wireless communication apparatus 100 executes an electrification process based on the predetermined components obtained at Step S1602. Namely, the electrification process unit 214 executes an electrification process by dividing the component "a" by the component "c", and then calculating the square of the quotient. Instead of dividing the component "a" by the component "c", and then calculating the square of the quotient, it may be done by dividing the component "a" by the component "c", and then taking the absolute value of the quotient.

At Step S1606, the wireless communication apparatus 100 sorts subcarrier numbers based on the quotient obtained from the predetermined components having the electrification process applied. Namely, the subcarrier assignment setting unit 208 sorts subcarrier numbers in descending order of the square or the absolute value of the quotient which is obtained by dividing the component "a" by the component "c".

At Step S1608, the wireless communication apparatus 100 assigns subcarriers to the demodulation process using the MLD method and the demodulation process using the MMSE method, following the order of subcarrier numbers sorted at Step S1606. Namely, the assignment instruction unit 210 generates an assignment signal for assigning subcarriers, following the information that represents the sorted order of subcarrier numbers. The assignment instruction unit 210 inputs the assignment signal to the assignment switch 1089.

Algorithms other than the MMSE method and the MLD method may be included in a selection of an algorithm to be used for the signal separation process. Specifically, a ZF (Zero-Forcing) method may be included in algorithms to be selected.

Also, the process of the assignment determination unit 1088 may be used for the switching determination unit 1084 in the first embodiment. In this case, a threshold value is set for the square or the absolute value of the quotient that is obtained by dividing the component "a" by the component "c" so that the switching determination unit 1084 outputs the switching signal to be processed by the first signal separation unit 1086 if it is less than the threshold value, or outputs the switching signal to be processed by the second signal separation unit 1087 if it is greater than or equal to the threshold value.

Third Embodiment

Wireless Communication Apparatus

A wireless communication apparatus 100 in the present embodiment is substantially the same as that described with reference to FIG. 1.

<Demodulation Circuit 108>

Figure 17:
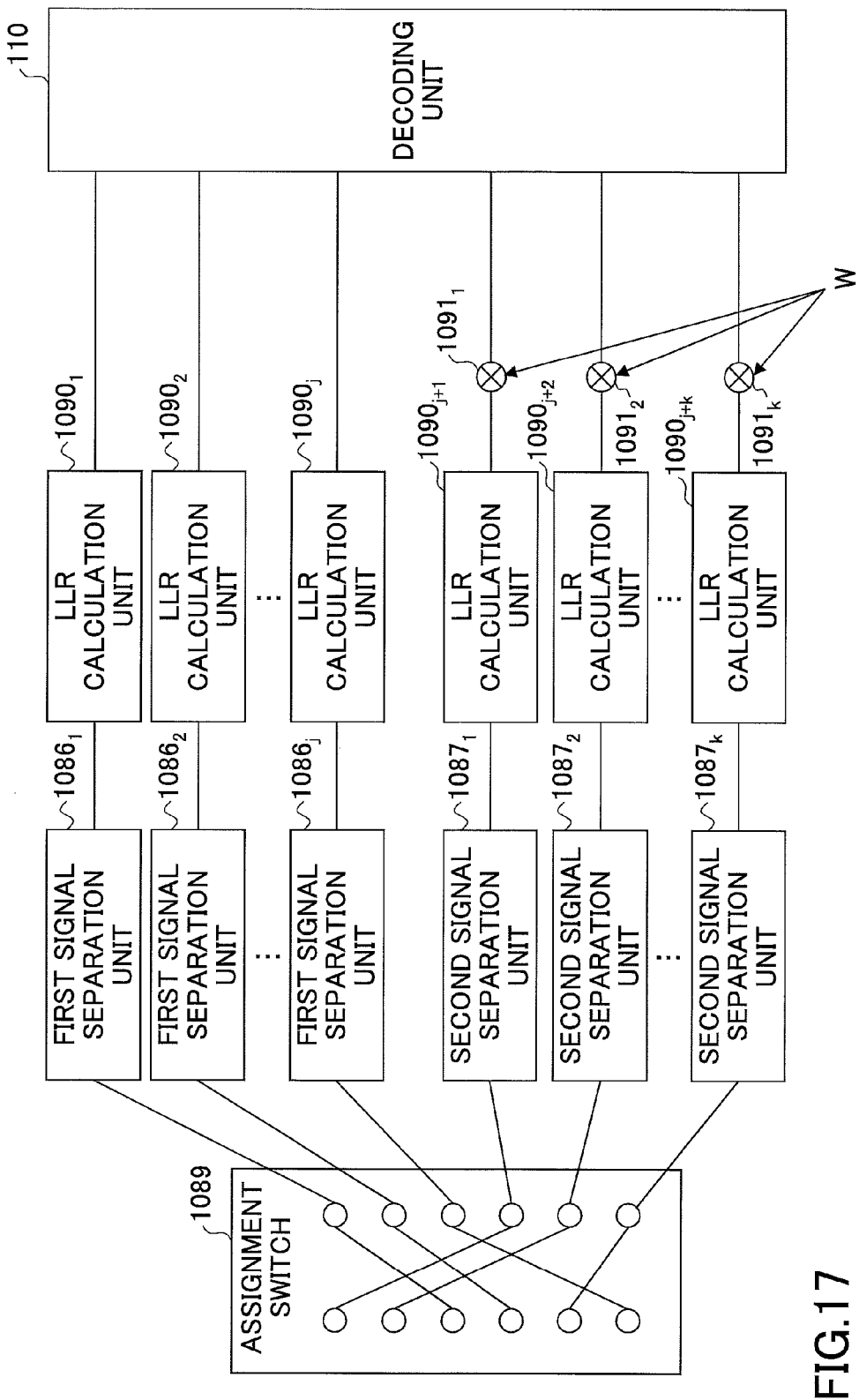
FIG. 17 is a schematic view illustrating an example of a digital signal processing circuit according to an embodiment.

A demodulation circuit 108 in the present embodiment is substantially the same as that described with reference to FIG. 10. It is different, however, in that the demodulation circuit 108 in the present embodiment includes LLR calculation units $1090_1$-$1090_{j+k}$ connected with the first signal separation units $1086_1$-$1086_j$ and the second signal separation units $1087_1$-$1087_k$, respectively; and multipliers $1091_1$-$1091_k$ connected with the LLR calculation units $1090_{j+1}$-$1090_{j+k}$, respectively, as illustrated in FIG. 17.

Signals output from the LLR calculation units $1090_1$-$1090_j$ and signals output from the multipliers $1091_1$-$1091_k$ are input into a decoding unit 110.

The LLR calculation units $1090_1$-$1090_j$ calculate log likelihood ratios for bits in signals output from the first signal separation units $1086_1$-$1086_j$. The LLR calculation units $1090_1$-$1090_j$ input information that represents the log likelihood ratios calculated for the bits into the decoding unit 110.

The LLR calculation unit $1090_{j+1}$-$1090_{j+k}$ calculate log likelihood ratios for bits in signals output from the second signal separation unit $1087_1$-$1087_k$. The LLR calculation unit $1090_{j+1}$-$1090_{j+k}$ input information that represents the log likelihood ratios calculated for the bits into the multipliers $1091_1$-$1091_k$.

The multipliers $1091_1$-$1091_k$ multiply the log likelihood ratios calculated for the bits from the LLR calculation unit $1090_{j+1}$-$1090_{j+k}$ by a weight coefficient W. The multipliers $1091_1$-$1091_k$ input the log likelihood ratios having been multiplied by the weight coefficient W into the decoding unit 110.

The decoding unit 110 executes decoding using error correction codes. The decoding unit 110 executes decoding based on LLRs generated from demodulation results. If different algorithms are used for the demodulation process, LLRs generated from demodulation results may have different signal levels. It is preferable to adjust amplitude levels if different algorithms are used for the demodulation process. In the example illustrated in FIG. 17, signals output from the LLR calculation units $1090_{j+1}$-$1090_{j+k}$ are multiplied by the weight coefficient W. Signals output from the LLR calculation units $1090_1$-$1090_j$ are not multiplied by the weight coefficient W. In this way, amplitude levels of the output signals from the LLR calculation units can be adjusted even if different algorithms are used for the demodulation process. Therefore, consistent soft-decision bits can be transferred to the decoding unit 110 even if different algorithms are used for the demodulation process.

According to the present embodiment, using a propagation channel matrix obtained by QR decomposition, the demodulation process using the MMSE method and the demodulation process using the MLD method are switched. Namely, for a propagation channel with which a sufficient characteristic can be obtained by the demodulation process using the MMSE method, the demodulation process using the MMSE method is executed. Specifically, only about 0.2 dB of characteristic degradation is observed by executing the demodulation process using the MMSE method for about 60% of subcarriers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus receiving a signal transmitted from a plurality of transmission antennas by a plurality of reception antennas, comprising:
    a rotational component removal unit configured to remove rotational components from a channel matrix representing a characteristic of a transmission path between the plurality of transmission antennas and the plurality of reception antennas, the channel matrix being generated based on the reception signal;
    a plurality of signal separation units including at least a signal separation unit configured to use a first signal separation algorithm for a demodulation process of the reception signal, and a signal separation unit configured to use a second signal separation algorithm for the demodulation process of the reception signal; and
    a control unit configured to execute control for determining one of the plurality of signal separation units to be used for the demodulation process of the reception signal, based on a predetermined component of the channel matrix having the rotational components removed.

2. The wireless communication apparatus as claimed in claim 1, wherein the control unit executes control for determining one of the plurality of signal separation units to be used for the demodulation process of the reception signal, based on the predetermined component of the channel matrix having the rotational components removed, and a predetermined threshold value.

3. The wireless communication apparatus as claimed in claim 2, wherein the predetermined threshold value is set based on results of demodulation by the algorithms used in the plurality of signal separation units, the results being obtained in a propagation environment represented by the predetermined component of the channel matrix having the rotational components removed.

4. The wireless communication apparatus as claimed in claim 1, wherein the control unit executes control for determining one of the plurality of signal separation units to be used for the demodulation process of the reception signal, based on reception error rates obtained by applying the algorithms used in the plurality of signal separation units to the demodulation process in a propagation environment represented by the predetermined component of the channel matrix having the rotational components removed.

5. The wireless communication apparatus as claimed in claim 4, wherein the control unit executes control for determining one of the plurality of signal separation units to be used for the demodulation process of the reception signal, based on a table representing a relationship between the propagation environment represented by the predetermined component of the channel matrix having the rotational components removed, and the reception error rates.

6. The wireless communication apparatus as claimed in claim 1, further comprising:
   a fast Fourier transform unit configured to transform the reception signal into subcarrier signals;
   a channel estimation unit configured to generate the channel matrices based on the subcarrier signals transformed by the fast Fourier transform unit;
   wherein the rotational component removal unit removes rotational components from a first one of the channel matrices being generated for a first one of the subcarrier signals of the reception signal,
   wherein the control unit executes control for determining one of the signal separation units to be used for the demodulation process of the first one of the subcarrier signals, based on the predetermined component of the first one of the channel matrices having the rotational components removed.

7. The wireless communication apparatus as claimed in claim 1,
   wherein the rotational component removal unit removes the rotational components by applying QR decomposition to the channel matrix generated by the channel estimation unit,
   wherein the control unit executes control for determining one of the plurality of signal separation units to be used for the demodulation process of the reception signal, based on a predetermined component of an R matrix of the channel matrix having the QR decomposition applied.

8. The wireless communication apparatus as claimed in claim 7, wherein the R matrix is a matrix represented by, a following formula, $$R = \begin{pmatrix} a & b \\ 0 & c \end{pmatrix}$$

and the predetermined components include a component "a" and a component "c" of the R matrix.

9. The wireless communication apparatus as claimed in claim 1, wherein the control unit determines one of the plurality of signal separation units to be used for the demodulation process of the reception signal for each slot.

10. The wireless communication apparatus as claimed in claim 9, wherein the control unit determines one of the plurality of signal separation units to be used for the demodulation process of the reception signal, using a predetermined symbol included in the slot.

11. The wireless communication apparatus as claimed in claim 9, wherein the control unit determines one of the plurality of signal separation units to be used for the demodulation process of the reception signal, using a predetermined symbol included in a slot preceding the slot.

12. The wireless communication apparatus as claimed in claim 6, wherein the rotational component removal unit removes the rotational components from one of the channel matrices generated for the subcarrier signals, the channel matrices being generated for the subcarrier signals by the channel estimation unit, and the one of the channel matrices corresponding to a predetermined one of the subcarrier signals included in a subcarrier block being constituted with consecutive subcarriers,
   wherein the control unit determines one of the signal separation units to be used for the demodulation process of a subcarrier other than the predetermined one of the subcarriers, based on the predetermined component of the channel matrix having the rotational components removed by the rotational component removal unit and a predetermined threshold value.

13. The wireless communication apparatus as claimed in claim 1, wherein the signal separation algorithms used by the plurality of the signal separation units include a Maximum Likelihood Detection (MLD) method and at least one of a Minimum Mean Square Error (MMSE) method and a Zero-Forcing (ZF) method.

14. The wireless communication apparatus as claimed in claim 1, further comprising:
   a log likelihood ratio calculation unit configured to calculate a log likelihood ratio of the reception signal demodulated by one of the signal separation units determined by the control unit;
   a weight coefficient multiplier configured to multiply the log likelihood ratio calculated at the log likelihood ratio calculation unit by a weight coefficient to adjust an output level depending on one of the algorithms used for the signal separation; and
   a decoding unit configured to decode the reception signal based on the log likelihood ratio having the weight coefficient multiplied by the weight coefficient multiplier.

15. A communication method executed on a wireless communication apparatus receiving a signal transmitted from a plurality of transmission antennas by a plurality of reception antennas, the method comprising:
   removing rotational components from a channel matrix representing a characteristic of a transmission path between the plurality of transmission antennas and the plurality of reception antennas, the channel matrix being generated based on the reception signal;
   determining a signal separation algorithm to be used for a demodulation process of the reception signal among a plurality of signal separation algorithms based on a predetermined component of the channel matrix having the rotational components removed.

* * * * *